US012619263B2

(12) United States Patent
Kim et al.

(10) Patent No.: US 12,619,263 B2
(45) Date of Patent: May 5, 2026

(54) ROBOT CONTROL SYSTEM AND ROBOT CONTROL METHOD

(71) Applicant: LG ELECTRONICS INC., Seoul (KR)

(72) Inventors: Byungki Kim, Seoul (KR); Eunkyoung Hong, Seoul (KR)

(73) Assignee: BEAR ROBOTICS KOREA, INC., Seoul (KR)

( * ) Notice: Subject to any disclaimer, the term of this patent is extended or adjusted under 35 U.S.C. 154(b) by 35 days.

(21) Appl. No.: 18/419,113

(22) Filed: Jan. 22, 2024

(65) Prior Publication Data

US 2024/0385629 A1 Nov. 21, 2024

(30) Foreign Application Priority Data

May 19, 2023 (KR) ........................ 10-2023-0065032

(51) Int. Cl.
*G05D 1/698* (2024.01)
(52) U.S. Cl.
CPC ................................... *G05D 1/698* (2024.01)
(58) Field of Classification Search
CPC .... G05D 1/698; G05D 1/246; G05D 2109/10; G05D 1/6987; G06Q 10/08; B25J 9/1679; B25J 5/00; B25J 9/1661; B25J 9/1664; B25J 9/1682; B25J 13/006
See application file for complete search history.

(56) References Cited

U.S. PATENT DOCUMENTS

| | | | | |
|---|---|---|---|---|
| 2019/0129445 A1* | 5/2019 | Koo | ........................ | B25J 9/1664 |
| 2021/0046831 A1* | 2/2021 | Kim | ........................... | H02J 7/02 |
| 2022/0236742 A1* | 7/2022 | Oda | ..................... | G06Q 10/083 |
| 2024/0152154 A1* | 5/2024 | Byeon | .................. | G05D 1/2464 |

FOREIGN PATENT DOCUMENTS

| | | | | | |
|---|---|---|---|---|---|
| CN | 109002044 A | * | 12/2018 | ........... | G05D 1/0293 |
| CN | 112541648 A | * | 3/2021 | ......... | G06Q 10/0631 |
| KR | 10-2040218 B1 | | 11/2019 | | |
| WO | WO-2024011955 A1 | * | 1/2024 | ............... | B65G 1/04 |

OTHER PUBLICATIONS

CN-109002044-A English Trans (Year: 2006).*
WO2024011955A1—Translation (Year: 2024).*
CN112541648A (Year: 2021).*

* cited by examiner

*Primary Examiner* — Ian Jen
*Assistant Examiner* — Renee LaRose
(74) *Attorney, Agent, or Firm* — Birch, Stewart, Kolasch & Birch, LLP

(57) ABSTRACT

A method performed by a server configured to communicate with a plurality of robots, can include forming a queue of the plurality of robots, assigning a task to at least one of the plurality of robots within the queue, releasing a queue mode of the task-assigned robot when the task-assigned robot departs from a queue of the plurality of robots, and shifting at least one or more robots among the plurality of robots within the queue forward by checking an occupancy rate for a forward part of the queue, in response to the departure of the task-assigned robot from the queue.

17 Claims, 8 Drawing Sheets

FORM QUEUE OF PLURAL ROBOTS — 310

ASSIGN TASK TO AT LEAST ONE ROBOT OF PLURAL ROBOTS — 320

RELEASE QUEUE MODE OF TASK-ASSIGNED ROBOT WHEN TASK-ASSIGNED ROBOT DEPARTS FROM QUEUE — 330

CONTROL AT LEAST ONE ROBOT IN QUEUE TO SHIFT FORWARD BY CHECKING OCCUPANCY RATE FOR FORE PART OF QUEUE, IN RESPONSE TO DEPARTURE OF TASK-ASSIGNED ROBOT FROM QUEUE — 340

400

—— : ROBOT MOVEMENT PATH(L)

—— : ROBOT MOVEMENT PATH(L)

ROBOT CONTROL SYSTEM AND ROBOT CONTROL METHOD

CROSS-REFERENCE TO RELATED APPLICATION

Pursuant to 35 U.S.C. § 119 (a), this application claims the benefit of the earlier filing date and the right of priority to Korean Patent Application No. 10-2023-0065032, filed on May 19, 2023, the contents of which are incorporated by reference herein in their entirety.

TECHNICAL FIELD

The present disclosure relates to a robot travel control system and a robot control method, and more particularly, a robot control system and a robot control method, capable of controlling a plurality of robots in a queuing manner.

BACKGROUND

A robot means a machine capable of autonomously traveling to carry out a given task by itself, and is being used in various fields. The robot can travel while avoiding obstacles, by virtue of a plurality of sensors disposed to avoid such obstacles during traveling.

Meanwhile, various technologies for controlling a plurality of robots more efficiently are under development. For example, robots that carry out tasks at a warehouse, an airport, or the like temporarily stand by at designated areas for distribution picking tasks or passengers within the airport, and sequentially perform designated tasks.

In this instance, it can be preferable that the robots which wait at the designated areas are prepared in advance to perform corresponding tasks immediately.

In this regard, Korean Registration Patent No. 10-2040218 (hereinafter, 'Patent Document 1') discloses a technology that each robot recognizes a queue through a camera thereof, and searches for a position to stand by before and after performing a task.

However, in Patent Document 1, since each robot determines its position based on an area recognized by the camera, accuracy is lowered and there is a limitation in integrated control of the plurality of robots in a queuing manner.

In addition, in Patent Document 1, when charging is required, each robot should move to a charging dock by self-determining whether or not charging is needed or should be individually moved through a manual input directly applied by a user. This causes a difficulty in expecting an efficient charging process. If charging docks are insufficiently provided upon operating the plurality of robots, it is not easy to efficiently charge the robots.

SUMMARY

Therefore, one aspect of the present disclosure according to an embodiment is to provide a robot travel control system and a robot control method, capable of more efficiently controlling a plurality of robots within a queue and performing charging processes in an integrated manner upon operating the plurality of robots within a designated space.

Another aspect of the present disclosure is to provide a robot travel control system and a robot control method, including a logic in which when a robot to which a task has been assigned is out of a queue, another robot to which a next task is to be assigned is automatically ready in an optimal state, and such state is visually identified.

Still another aspect of the present disclosure is to provide a robot travel control system and a robot control method, including a logic in which robots which have completely performed tasks sequentially enter a queue to perform next tasks or charging, and such state is visually identified.

Still another aspect of the present disclosure is to provide a robot travel control system and a robot control method, capable of providing an optimal charging process to a plurality of robots within a queue in consideration of battery states and next task time of the plurality of robots.

Still another aspect of the present disclosure is to provide a robot travel control system and a robot control method, capable of optimally selecting a robot in a queue to be necessarily charged and selectively providing various moving manners to the identified robot such that the robot can move out of the queue to go to a charging dock in an appropriate manner for a current state of the queue.

In a robot control system and a robot control method according to an embodiment of the present disclosure, a server can sequentially assign tasks to a plurality of robots included in a queue through communication, and control a movement of a subsequent robot within the queue so as to assign a subsequent task quickly and accurately.

In this instance, when a robot within the queue performs an operation for a movement start, in response to an assignment of a task, it is determined that the robot has departed from the queue, and a queue mode of the robot is released. Afterwards, robots within the queue sequentially shift forward based on an occupancy rate for a front mounting area with in the queue.

Specifically, a robot control method, which is performed by a server communicating with a plurality of robots, according to an embodiment of the present disclosure includes forming queues of a plurality of robots, assigning a task to at least one of the plurality of robots, releasing a queue mode of the task-assigned robot when the robot departs from a queue of the robot, and shifting at least one or more robots within the queue forward by checking an occupancy rate for a fore part of the queue, in response to the departure of the task-assigned robot from the queue.

In an embodiment, the releasing the queue mode of the robot can include sensing a generation of a movement start event of the task-assigned robot, and releasing the queue mode of the robot by checking a departed degree of the task-assigned robot from a mounting area, in response to the sensed event generation.

In an embodiment, the robot control method can further include: sensing that the task-assigned robot is to enter the queue after completion of the task; assigning a mounting area of the queue, in which the robot to enter is to be located, according to a preset condition; and switching the robot moved to the assigned mounting area into the queue mode.

In an embodiment, the preset condition can be related to one or more of an occupancy rate of the robot within the queue and a current position of the robot to enter.

In an embodiment, the robot control method can further include; controlling the task-assigned robot to return to the queue of a queue area after completion of the assigned task; computing an average State of Charge (SoC) of robots waiting in the queue area; generating a list of robots to be charged, each having SoC less than the computed average SoC; and controlling at least one of the robots to be charged within the list to move away from the queue area by a movement method determined according to a state of the queue.

In an embodiment, the controlling can include controlling a front robot in the queue, in which the at least one of the robots to be charged within the list is located, to shift forward to depart from the queue, and controlling the front robot departed from the queue to enter an end of the corresponding queue while the at least one robot moves along a designated direction after departing from the queue area.

In an embodiment, the controlling can be a step of controlling the at least one of the robots to be charged within the list to depart from the queue area by moving between adjacent queues within the queue area, in a state of the queue having a space in which a distance between the queues is equal to or greater than a threshold distance.

In an embodiment, the controlling can include: controlling the at least one of the robots to be charged within the list to move in a direction of departing from the queue, together with a neighboring robot of at least one neighboring queue based on a mounting area of the at least one robot; and controlling the neighboring robot departed from the queue to enter an end of the corresponding queue while the at least one robot moves along a designated direction after departing from the queue area.

In an embodiment, the robot control method can further include, after the controlling: controlling the robots within the list of the robots to be charged to sequentially move toward a charging dock to charge the robots until reaching the average SoC; and controlling a completely-charged robot to return to the queue within the queue area.

In an embodiment, the robot control method can further include: setting an SoC threshold range by computing a reduction of battery levels of robots remaining in the queue area while the robots within the list of the robots to be charged are charged; adding robots each having an SoC value within the computed SoC threshold range, among the robots remaining in the queue area, to the list of the robots to be charged; and Repeatedly performing a charging process by setting a target SoC based on a subsequent task start time when the charging of the robots included in the list of the robots to be charged is completed.

Also, a robot control system according to an embodiment of the present disclosure includes: a plurality of robots; and a server communicating with the plurality of robots. The server is configured to assign a task to at least one of a plurality of robots forming a queue within a preset queue area and release a queue mode of the task-assigned robot when the task-assigned robot departs from the queue, and shift at least one or more robots within the queue forward by checking an occupancy rate for a fore part of the queue, in response to the departure of the task-assigned robot from the queue.

In a robot control system and a robot control method according to embodiments of the present disclosure, when a plurality of robots operate in a designated space, the plurality of robots within a queue can be controlled and managed as one group, efficient waiting associated with task assignment and a charging process can be provided integrally.

In a robot control system and a robot control method according to embodiments of the present disclosure, when a task-assigned robot is moved out of a queue, a robot to which the next task is to be assigned automatically stands by at an optimal location. This can allow a fast task assignment and even visually-stabilized queue management.

In a robot control system and a robot control method according to embodiments of the present disclosure, robots which have completed their tasks can sequentially enter the queue to perform subsequent tasks or charging, and an optimal charging process can be executed without a user's manual input, by considering battery states and subsequent task time of the robots within the queue.

In a robot control system and a robot control method according to embodiments of the present disclosure, a movement method of the robots within the queue can be applied to be appropriate for a state of the queue, which can result in performing flexible and fast individual robot control even while the plurality of robots are controlled as a group.

DETAILED DESCRIPTION OF THE EMBODIMENTS

Figure 1:
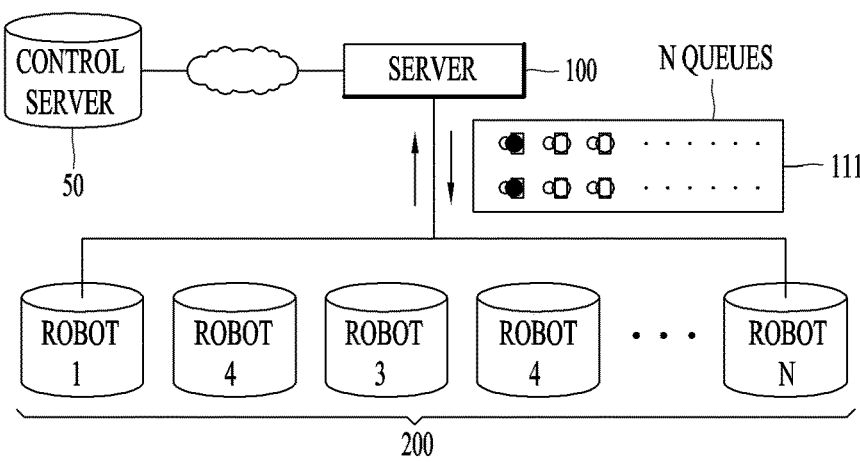
FIG. 1 is an exemplary view illustrating a communication system between a plurality of robots and a server, in accordance with an embodiment of the present disclosure.

Description will now be given in detail according to exemplary embodiments disclosed herein, with reference to the accompanying drawings. For the sake of brief description with reference to the drawings, the same or equivalent components can be provided with the same or similar reference numbers, and description thereof will not be repeated. In general, a suffix such as "module" and "unit" can be used to refer to elements or components. Use of such a suffix herein is merely intended to facilitate description of the specification, and the suffix itself is not intended to give any special meaning or function. In describing the present disclosure, if a detailed explanation for a related known technology or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. can be used herein to describe various elements, these elements should not be limited by these terms. These terms are generally only used to distinguish one element from another.

It will be understood that when an element is referred to as being "connected with" another element, the element can be connected with the another element or intervening elements can also be present. In contrast, when an element is referred to as being "directly connected with" another element, there are no intervening elements present.

A singular representation can include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps can likewise be utilized.

On the other hand, the term "robot" disclosed herein refers to a machine capable of performing a designated task or mission while traveling autonomously. In the present disclosure, the robot can be used for denoting a plurality of robots, that are capable of performing designated tasks or missions while traveling in a designated space, for example, a plurality of distribution robots, delivery robots, or other moving robots. In this case, while robots are performing their tasks or missions, those robots can be likely to be crowded in areas such as intersections or to collide with one another depending on a driving (traveling) path or moving direction of each robot.

Also, the term "queue area" disclosed herein denotes an area including one or more queues in a designated space on a map. The term "queue area" also means an area in which a plurality of robots are gathered and wait (stand by) before tasks are assigned and/or after tasks are completed.

One or more queues can be included in the queue area. Each queue can include a plurality of mounting areas in which robots are to be located. Here, the mounting areas mean waiting points at which individual robots are to be located within the queue.

Robots within a queue can be controlled as one group by a server. To this end, the server can prestore and identify a location of a queue area, a location of a queue, and a location of a mounting area. The server can compare those prestored locations with a current location of a robot.

When robots in the queue are controlled as one group by the server, it can be understood that each robot is in a 'queue mode.' Also, when at least one of the robots in the queue is moved out of the queue, it can be recognized as 'queue mode release.'

In the present disclosure, a plurality of queue areas can exist in a designated area on a map. In this case, each queue area can have different, size, shape, and location. Also, a plurality of queues can exist in one queue area. For example, when the queue area is 4*4, it can be understood that four queues exist in one queue area. Each of the plurality of queues can have a different length.

FIG. 1 is an exemplary view illustrating a robot control system between a plurality of robots and a server, in accordance with an embodiment of the present disclosure.

FIG. 1 illustrates that the server 100 communicates with a control server 50 to receive a command that relates to a control of a plurality of robots in a queuing manner. For example, the server 100 can communicate with the control server 50 illustrated in FIG. 1, receive tasks for robots 200, and assign the tasks to the robots 200, respectively. The server 100 can serve as a control server or can be implemented in an integrated form with the control server. Hereinafter, a description will be given under assumption that the server 100 includes a function of a control server or includes the control server.

Referring to FIG. 1, the robot control system includes robots 200 and a server 100 communicating with the robots.

The server 100 can assign tasks to robots 200 in a queue. At least one robot, to which a task has been assigned, among the robots 200 in the queue generates a movement start event and sends it to the server 100. The server 100 can receive a signal corresponding to the movement start event from the task-assigned robot, and determine, in response to the reception of the signal, whether or not the corresponding robot has departed from the queue.

The robot 200 operates in a queue mode within the queue. The robot 200 operates in a queue mode release when departed from the queue. To this end, the server 100 can recognize the queue mode/queue mode release based on whether the robot 200 occupies a mounting area within the queue.

For example, the server 100 can calculate an occupancy rate of the robot 200 for the mounting area by comparing a current location of the robot 200 within the queue with a prestored location of the mounting area, and determine that the robot 200 occupies the mounting area based on the calculated occupancy rate. The server 100 can then recognize the queue mode of the corresponding robot 200.

On the other hand, for example, the server 100 can calculate an occupancy rate of a task-assigned robot 200 for a mounting area by comparing a current location of the task-assigned robot 200 within a queue with a prestored location of the mounting area, and determine that the robot 200 has moved out of the mounting area based on the calculated occupancy rate. The server 100 can then recognize the queue release mode of the corresponding robot 200.

The server 100 can control the movement of the robots 200 in the queue in a queuing manner based on the recognition of the queue mode/queue mode release.

The robots 200 which are a plurality of robots can include, for example, Robot1, Robot2, . . . , RobotN, which travel in a designated space on a map. The plurality of robots 200 can be located within one queue or within different queues.

Here, the map is a map for a travel zone, and can include, for example, a navigation map, a simultaneous localization and mapping (SLAM) map, a learning map, a topological map, a cell data-based grid map, an obstacle recognition map, or the like. In the present disclosure, a description is given under assumption that the robot 200 travels in a designated space on a topological map or a SLAM map which is used for recognizing a global location. However, the present disclosure is not limited thereto.

The robots 200 operate in a queue mode within a queue which is located in a queue area 111, and are controlled and managed as one group by a server 100 while operating in the queue mode.

The queue area 111 can be one or more located within a designated space on a map. When the queue area 111 is in plural, each queue area is independently controlled and managed, and the control and management for robots within one queue area does not affect the control and management for robots in another queue area.

Also, one or more queues can be included in the queue area 111, and can have different lengths. The queues within the queue area 111 can be implemented in an array configuration, for example, in the configuration of n*n or n*m.

The control for the robots 200 is performed by the server 100 in a queuing manner. Here, performing the control for the robots 200 in the queuing manner means managing robots operating in the queue mode as one group within the queue area 111. That is, it includes an integrative management of the server 100 for locations, movement, operating modes of the robots within the queues, such that the robots 200 fast perform their tasks.

To this end, the server 100 can recognize the queue area 111 disposed on a map space, and recognize the number of queues (e.g., N queues), lengths of queues, a disposition state of queues, and the like, within the queue area 111.

Also, the server 100 can recognize occupancy and departure (non-occupancy) (for the mounting area) by a robot within the queue area 111, and control the movement of other robots within the queue area 111 based on the recognition result.

Also, the server 100 can recognize a change in length of the queue according to the occupancy and departure (non-occupancy) (for the mounting area) by the robot within the queue area 111, and control a robot at an end of a specific queue to move to an end of an adjacent queue based on the recognition result. When a plurality of queues are maintained, tasks are assigned simultaneously or at a time to robots within each of the plurality of queues, to effectively shorten an entire task end time.

The server 100 can communicate with the robots 200 through wired or wireless communication. For example, the robots 200 can perform communication with the server 100 by using wireless communication technologies, such as Wireless LAN (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like.

The server 100 can prestore mounting areas where the robots 200 can be located within the queue area 111, namely, points where the robots are mounted in a queue.

The server 100 can determine, based on a signal transmitted from the robot 200, whether the robot 200 is occupying the mounting area or has departed from the mounting area, and control the movement of other robots within the queue area 111 based on the determination result.

In the present disclosure, the server 100 recognizes a queue mode release of a task-assigned robot based on a signal transmitted from the robot 200, and thereafter checks an occupancy rate of the robot with respect to the mounting area so as to determine whether the robot has actually moved out of the mounting area. Accordingly, the determination as to whether the robot 200 is occupying or has departed from the mounting area can be performed without an error. Here, the signal transmitted from the task-assigned robot 200 is generated, in response to a movement start event of the task-assigned robot 200.

The server 100 can independently perform the control of the movement for the robots in each of the plurality of queue areas or in each of the plurality of queues within one queue area.

For example, the server 100 can assign tasks to the robots in each of the plurality of queues. When it is confirmed that the task-assigned robots have departed from each queue, the server 100 can release the queue mode and check an occupancy rate with respect to the fore part of the queue, to control the succeeding robots on standby to be shifted. Here, the task assignment for each of the plurality of queues, the queue departure confirmation, the queue mode release, the check of the occupancy rate with respect to the fore part of the queue, and the shift movement are independently carried out.

When the robot 200 enters a queue area and occupies a specific mounting area within the queue (e.g., an end mounting area of the queue), the robot 200 is switched to the queue mode. When the robot 200 operating in the queue mode departs from the mounting area, the queue mode is released.

Therefore, when the check of the occupancy rate with respect to the fore part of the queue and the shift movement are repeatedly performed until arriving at the forefront of the queue, the queue mode and the queue mode release can also be repeatedly performed.

The server 100 can communicate with the robots 200 within the queue area 111 to receive a signal corresponding to a generation of a movement start event of a task-assigned robot. In response to the reception of the signal, the server 100 can recognize the queue mode release. Here, the queue mode release can be caused by the movement of the robot, to which the task has been assigned by the server 100, or caused by the server 100 that has sensed the movement of the robot.

The server 100 determines whether or not the corresponding robot has actually departed from the mounting area, in response to the queue mode release of the robot.

To this end, in response to a queue mode release signal, the server 100 calculates (recognizes, grasps) an occupancy rate for the mounting area where the task-assigned robot has been located, and determines (compares) whether the calculated (grasped) occupancy rate is less than a reference value (e.g., 60%), thereby identifying the departure of the robot from the mounting area.

Here, the occupancy rate can be calculated by comparing the current location of the corresponding robot with location coordinates of the corresponding mounting area and checking a degree (distance) by which the robot is departed from the mounting area. In this instance, the current location of the corresponding robot and the location coordinates of the corresponding mounting area can be checked through the SLAM map or from the server 100.

Specifically, the server 100 can calculate an occupancy rate by comparing pre-registered location information of a mounting area with a current location of a robot that has occupied the mounting area. In this instance, since it is difficult to expect that the robot is located exactly in the mounting area, the server 100 can calculate the occupancy rate based on the pre-registered location information of the mounting area and the change of the location of the robot compared to a previous location of the robot, or can calculate the occupancy rate by including a threshold value deviated from an actual location of the mounting area.

In another example, the occupancy rate can be calculated by additionally or alternatively analyzing, by the server 100, an image that a robot at the rear in the queue have captured a front mounting area through a camera sensor. For example, the server 100 can determine whether the robot 200 has departed from the mounting area by combining analysis results of images captured by a camera, transmitted through the robot 200.

When the departure from the mounting area is determined, the server 100 controls the succeeding robot of the queue area 111, namely, a robot that is waiting behind the robot departed from the mounting area to be shifted to occupy the corresponding mounting area. Afterwards, the server 100 repeats the shift control until reaching an end (last) robot of the queue. If the queue has a length N before the robot departs from the mounting area, the length of the queue is reduced to N−1 after completion of the shift.

Figure 2:
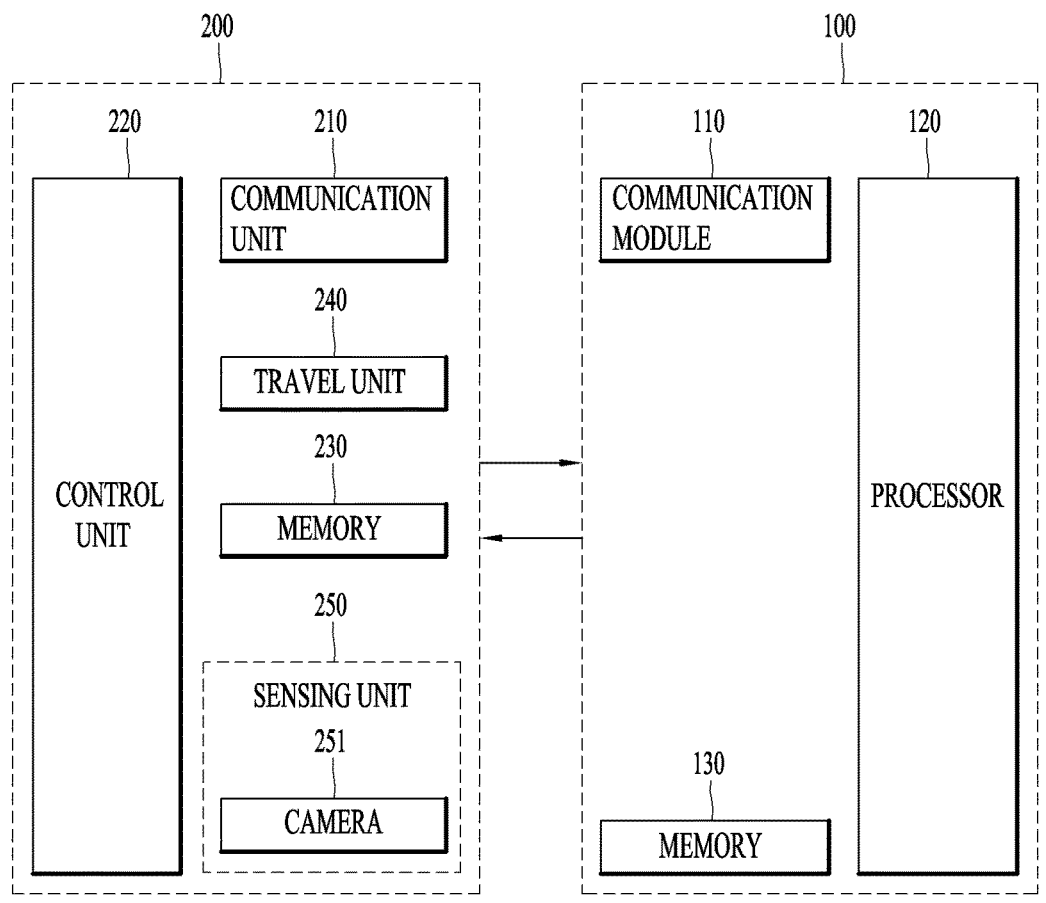
FIG. 2 is an exemplary block diagram illustrating detailed configurations of a robot and a server, in accordance with one embodiment of the present disclosure.

FIG. 2 is an exemplary block diagram illustrating detailed configurations of a robot and a server, in accordance with one embodiment of the present disclosure.

Referring to FIG. 2, the robot 200 can communicate with the server 100, and can include a communication unit 210, a control unit 220, a memory 230, a travel unit 240, and a sensing unit 250 having a camera 251. Meanwhile, those components illustrated in FIG. 2 are not essential for implementing the robot, and the robot 200 described herein can be provided with more or less components than the components listed above.

Also, in FIG. 2, the server 100 can communicate with a plurality of robots, and can include a communication module 110, a processor 120, and a memory 130. However, it can also be understood that the server 100 can include components greater or fewer than those components described above.

The communication unit 210 of the robot 200 can include one or more modules allowing wireless communication with the server 100, and one or more modules for connecting the robot 200 to a network.

The communication unit 210 of the robot 200 can perform communications with an artificial intelligence (AI) server and the like by using wireless Internet communication technologies, such as Wireless LAN (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like. The communication module 110 can also perform communications with the server 100 by using short-range communication technologies, such as Bluetooth™, Radio Frequency Identification (RFID), Infrared Data Association (IrDA), Ultra Wideband (UWB), ZigBee, Near Field Communication (NFC), and the like.

The robot 200 can transmit its location information and a signal related to the queue mode or the queue mode release to the communication module 110 of the server 100 through the communication unit 210.

For example, the robot 200 can transmit a coordinates value corresponding to the current location to the communication module 110 of the server 100 through the communication unit 210. For example, the robot 200 can transmit to the server 100 a signal related to the queue mode according to an entry into the queue area 111 and an occupancy of the mounting area, or can transmit to the server 100 a signal related to the queue mode release, in response to a generation of a movement start event that the robot 200, to which the server 100 has assigned a task, departs from the mounting area.

The robot 200 can receive information related to the assigned task (e.g., a distribution picking location, a travel path up to destination, etc.), and a shift command according to the check of the departure from the mounting area.

The control unit 220 of the robot 200 generally controls an overall operation of the robot 200. The control unit 180 can process the assigned task or provide a service by processing signals, data, information, etc. input or output through the above-mentioned components, by activating application programs stored in the memory 230, or by controlling the travel unit 240.

Although not illustrated, the control unit 220 of the robot 200 can include a learning processor (not illustrated) for performing an operation associated with an artificial intelligent (AI) technology of the robot. Here, the learning processor can train one or more models constituted by an artificial neural network using learning data. To this end, the learning processor can receive, categorize, store, and output information to be used for data mining, data analysis, intelligent decision, and machine learning algorithm and technology. The learning processor can also include at least one memory unit configured to store information which is received, detected, sensed, generated, or predefined through the robot, information which is output through the robot in different manners, or data which is received, detected, sensed, generated, predefined or output through other components, devices and terminals. The learning processor 181 can be integrally disposed in the robot or can include a memory. In an embodiment, the learning processor can be implemented through the memory 230. However, the present disclosure is not limited thereto, but the learning processor can be implemented in an external memory involved in the robot 200 or can be implemented through the memory 130 of the server 100 that can communicate with the robot 200. In another embodiment, the learning processor can be implemented in a memory which is maintained in a cloud computing environment, or in another remote controllable memory which is accessible by the robot through a communication method such as network communication.

The memory 230 of the robot 200 stores data supporting various functions of the robot 200. The memory 230 can store a plurality of application programs (or applications) run in the robot 200, and data for operations of the robot 200, and command words. Also, the memory 230 can store map data for a space in which the robot 200 travels to perform a task or mission.

The memory 230 can also store a task assigned to the robot, travel path information for performing the assigned task, a location of a mounting area in a queue to which the robot belongs in a queue area, and an SoC measurement result.

The memory 170, for example, can include one or more types of storage media including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like.

The travel unit 240 of the robot 200 performs a travel such as movement, rotation, etc. of the robot body. To this end, the travel unit 240 can include a plurality of drive wheels, a drive motor, and a plurality of casters. The travel unit 240 can travel or rotate for picking products according to a control command received by the control unit 220 of the robot 200.

The travel unit 240 can also perform in-place rotation, movement for departure from a queue, and/or shift within a queue according to a movement command and/or charging command for the robot within the queue, received from the server 100.

The sensing unit 250 of the robot 200 can include various sensors, for example, a camera 251, an IR, a LiDAR, a radar, a proximity sensor, a UWB, etc. for avoiding obstacles while traveling in a designated space.

In the present disclosure, an image captured through the camera 251 can be used for checking an operation to control the robot 200 in the queuing manner. For example, the robot 200 can transmit the image captured through the camera 251 to the server 100 or the control unit 220 to make sure a location of a queue area on a map, a mounting area of a queue to be mounted, and a departure from a mounting area of a front robot within a queue.

Also, the robot 200 can include a power supply unit for supplying power to each component included in the robot 200 by receiving external power or internal power under the control of the control unit 220. The power supply unit 190 can include a battery, which can be an embedded battery or a replaceable battery.

At least some of the respective components can cooperatively operate to implement operations, controls or control methods of the robot in accordance with various embodiments described below. In addition, the operations, controls, or control methods of the robot can be implemented on the robot by running at least one application program stored in the memory 230. Various embodiments described below can be implemented in a medium readable by a computer or similar devices using, for example, software, hardware, or a combination thereof.

Meanwhile, the communication module 110 of the server 100 can receive, from each of a plurality of robots within the queue which communicate with the server, location information (e.g., a coordinates value corresponding to a current location), a signal associated with switching to a queue mode/queue mode release, charge request, and/or a state of charge (SoC) (a remaining battery level) measurement result of the robot.

For example, the communication module 110 can receive a signal associated with a queue mode according to location information and an occupancy of a mounting area from a robot that has entered a specific queue in a queue area.

The communication module 110 can also receive a signal associated with a queue mode release corresponding to a movement start event from a robot which is to depart from a specific queue in a queue area after a task is assigned thereto. Also, the communication module 110 can receive an SoC measurement result from each of robots which have come back to queues after completely performing tasks.

The processor 120 of the server 100 can assign a task to at least one robot that operates in a queue mode in a queue area. In this instance, the processor 120 can independently assign tasks to robots belonging to different queues in the queue area.

This can be likened to a case where a plurality of customers stand in queues at a plurality of checkout counters of a supermarket to sequentially make a payment. In this instance, it is similar to that a payment task with respect to customers belonging to a queue of a first checkout counter, among the plurality of queues, and a payment task with respect to customers belong to a queue of a second checkout counter are independently (simultaneously) performed.

The processor 120 releases a queue mode, in response to a generation of a movement start event of a robot, to which a task has been assigned, in each of a plurality of queues, and additionally determines whether the corresponding robot has departed from its mounting area.

That is, the processor 120 recognizes the queue mode release when receiving the movement start event of the robot. This can be a primary decision for determining the departure from the mounting area. After the queue mode release, the processor 120 can perform a secondary decision for determining whether the robot has actually departed from the mounting area by calculating an occupancy rate for the corresponding mounting area (e.g., determining a departed degree by comparing the current location of the robot with the coordinates of the mounting area).

In such a manner, whether the robot having the task assigned thereto has actually departed from the mounting area can be double-checked through the signal corresponding to the received movement start event and the actual occupancy, thereby determining the departure or non-departure from the mounting area without an error.

Meanwhile, the processor 120 can generate a travel route along which a robot departed from a queue of a mounting area moves to a destination associated with an assigned task, and provide the generated travel route to the corresponding robot.

In this instance, to avoid the possibility of collision with other robots in operation, the processor 120 can generate a travel route by giving a bias to a node or link of an intersection on a map on the basis of a moving direction of a robot that is traveling.

After finally determining the departure of the robot from the mounting area, the processor 120 generates a shift command for succeeding robots (robots behind the departed robot) and sequentially transmits the generated shift command to the succeeding robots to fill a vacant mounting area due to the departure of the robot from the mounting area.

The processor 120 repeats the process until the shift command reaches the end (last) robot in the queue. For example, in case where the length N of a queue is 9 (N=9), when the forefront robot departs from the queue after a task is assigned thereto, the next robot in the queue shifts to the forefront position, and the last robot of the queue performs a forward shift eight times (N−1=8).

The processor 120 controls the shift command to be executed within the same queue. However, in an exceptional situation, for example, when the length of at least one of the plurality of queues is 0 due to a repeated shift movement and a plurality of tasks to be assigned remain still, the processor 120 can control a robot located at an end of an adjacent queue to rotate and depart from its queue to move to the forefront of the queue with the length of 0.

Figure 3:
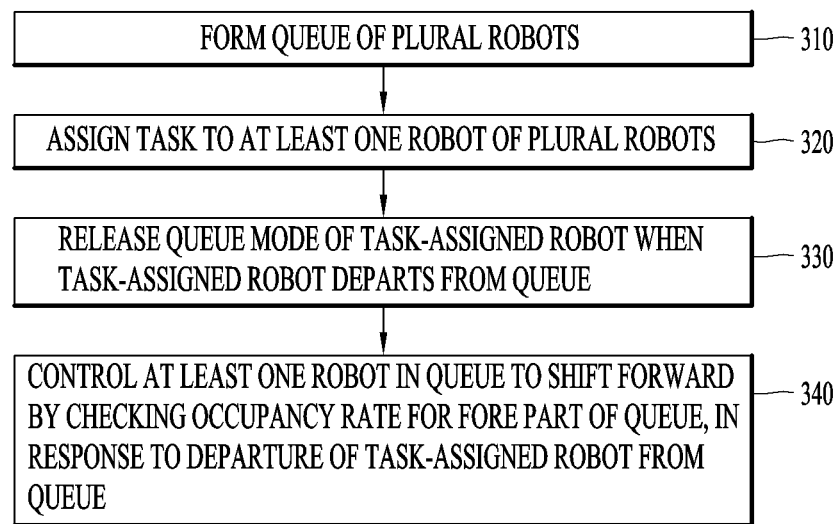
FIG. 3 is a representative flowchart illustrating a robot control method in accordance with an embodiment of the present disclosure.

FIG. 3 is a representative flowchart illustrating a robot control method in accordance with an embodiment of the present disclosure. Each step of the representative flowchart of FIG. 3 can be performed by a server that communicates with a plurality of robots operating in a designated space on a map, a processor of the server, or a device/server/cloud interoperating with the server. Also, some of those steps can be performed by the processor of the robot. The server can also be a Facility Management System (FMS) or can be configured to include the FMS or communicate with the FMS.

The server 100 can prestore, in the memory 130 and the like, locations, lengths, and shapes of queues disposed in the designated space on the map, and locations of mounting areas where robots are to be mounted within the queues, and call the information if necessary.

The server 100 can control robots, which belong to the queue area or queues in the queue area, as a type of one group, in a queuing manner.

Referring to FIG. 3, the server 100 can recognize that a plurality of robots form queues in a queue area (310). Here, the plurality of robots can belong to each of the plurality of queues in one queue area, and each robot occupies a mounting area of a queue. The plurality of robots forming the queues operate in a queue mode.

Next, the server 100 (see FIG. 1) assigns a task to at least one robot of the plurality of robots within the queue.

Here, there is no limit to a type of task to be assigned. For example, the tasks can include charging of a robot in addition to a task appropriate for the operation of the robot (e.g., logistics picking task).

Here, a robot operating in a queue mode means a state in which the robot occupies a specific mounting area within a queue and thus is controlled and managed by the server 100 in the form of group with other robots within the same queue. When the robot occupies the specific mounting area within the queue, the robot operates in the queue mode, and the server 100 can recognize this state.

Continuously, when the robot to which the task has been assigned departs from the queue, the server 100 releases queue mode for the corresponding robot (330).

In an embodiment, releasing the queue mode of the corresponding robot means that the server 100 detects a generation of a movement start event of the robot to which the task has been assigned, and in response to the detection of the event generation, releases the queue mode of the corresponding robot by checking a degree that the task-assigned robot departs from the mounting area.

That is, the robot is switched to the queue mode release in response to a movement of the robot to depart from a specific mounting area within the queue. As such, the queue mode is released when two conditions, namely, the task assignment to the robot and the generation of the movement start event are satisfied. This is more accurate and causes no error, compared to the simple determination of the queue mode release based on the fact that the robot has departed from the mounting area of the queue.

The server 100 can assign a task to a robot that is located at a task start point of the queue (e.g., the forefront of the queue). For example, the server 100 can sequentially assign tasks to robots that are located at the forefront of the queues. Here, the server 100 can independently assign tasks to the robots that are located at the forefront of the plurality of queues, respectively.

However, in some cases, when an optimal robot for performing a task is located in the middle of a queue, the server 100 can assign the task to the robot in the middle of the queue, or the robot in the middle of the queue can move out of the queue to perform the task according to a movement method to be described with reference to FIGS. 9 to 11.

In an embodiment, to select an optimal robot to which a task is to be assigned, the server 100 determines a robot, which can perform the task fastest, among movable robots, in consideration of a location of a destination related to the task.

To this end, the server 100 can generate a virtual movement path for each of robots within a queue based on current locations of the robots, and select a robot, which can arrive at a destination in the shortest time, within the queue. For example, the server 100 computes a movement path of each robot in a queue up to a logistics picking point, and selects an optimal path by giving a bias in a congested section. Even if the movement paths of all the robots within the queue are computed, computational complexity takes about 10 msec. Therefore, a task delay for selecting the optimal robot does not occur.

In an embodiment, when the robot has finally departed from the mounting area of the queue, namely, when a movement start event is generated in response to the assignment of the task to the corresponding robot from the server 100, the server 100 recognizes the queue mode release.

Continuously, in response to the departure of the task-assigned robot from the queue, the server 100 shifts forward at least one or more robots within the queue by calculating (checking) an occupancy rate for the fore part of the queue (340).

The server 100 can calculate the occupancy rate for the fore part of the queue by determining a departed distance from the mounting area, namely, a point where the robot has been mounted, based on the current location of the robot using the SLAM map. In this instance, the departed distance can be computed based on a variation between a previous location and the current location of the robot and an occupancy rate for the mounting area calculated based on coordinates of the location of the mounting area.

On the other hand, the server 100 can receive a signal corresponding to a task completion from the robot which has completed its task. The server 100 can transmit a return command to the queue in the queue area to the corresponding robot, in response to such task completion event.

Additionally, the server 100 can analyze a captured image, transmitted from the robot in the queue, and compute the occupancy rate of the robot for the front mounting area within the queue. The server 100 can then determine whether or not the robot has actually departed from the mounting area based on the computed occupancy rate, and control other robots within the queue to shift forward.

The server 100 can sequentially transmit a shift command to the succeeding robots, such that the succeeding robot within the queue area or within the same queue in the queue area occupies the front mounting area. On the other hand, only the task-assigned robot can generate a queue mode release signal, and the succeeding robots within the queue, namely, robots to shift can be maintained in the queue mode.

Or, a task-assigned robot can generate a first signal corresponding to a movement start event, and a robot which has received a shift command can generate a second signal distinctive from the first signal. Here, the first signal can include a queue mode release signal, and the second signal can not include the queue mode release signal.

In another embodiment, the server 100 can sequentially check the queue mode release and the actual departure from the mounting area of the succeeding robot, in response to the shift command, and perform the forward shift of the robot. The server 100 can repeat these processes until reaching the last (end) robot of the queue in the queue area.

According to the embodiment of the present disclosure, upon operating a plurality of robots, the plurality of robots within a queue can be controlled and managed as one group. Also, when a task-assigned robot is moved out of a queue, a robot to which the next task is to be assigned automatically stands by at an optimal location. This can allow a fast task assignment and even visually-stabilized queue management.

Figure 4:
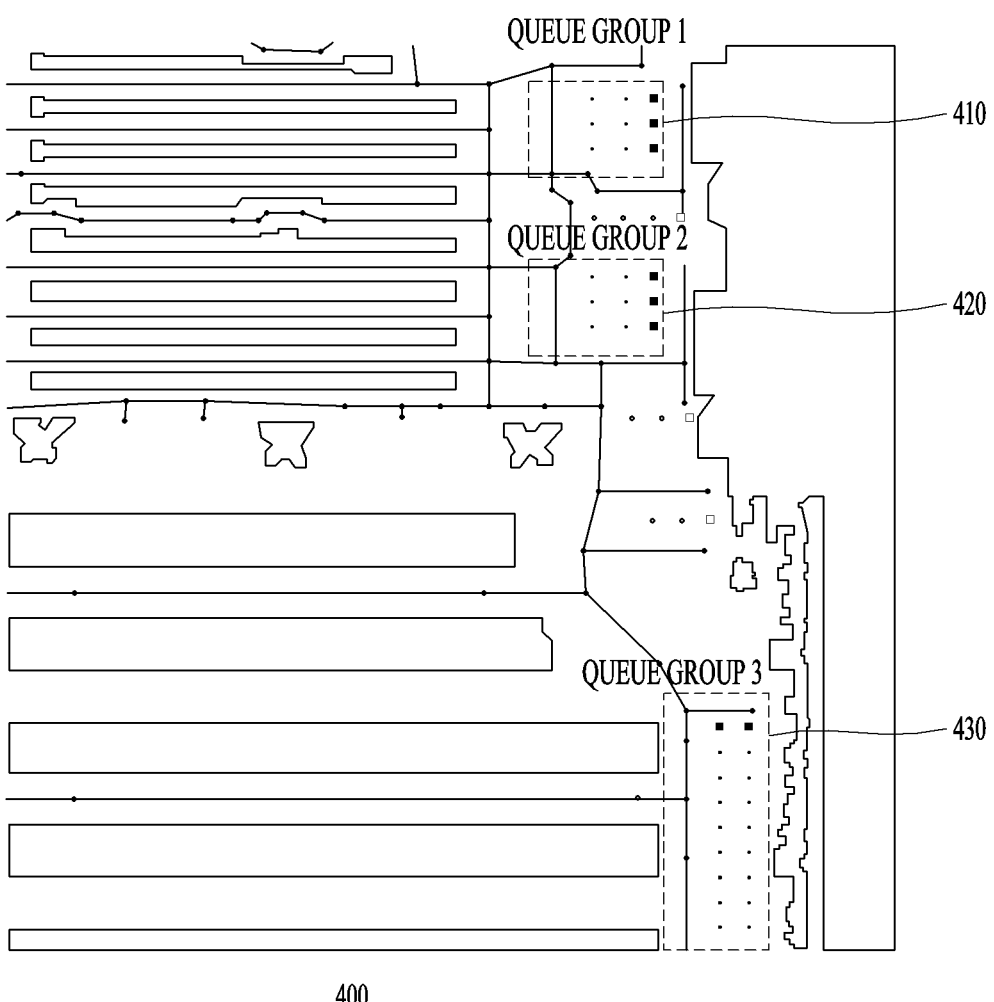
FIG. 4 is an exemplary view illustrating queues of robots in accordance with an embodiment of the present disclosure.

FIG. 4 is an exemplary view illustrating queues of robots in accordance with an embodiment of the present disclosure.

As illustrated in FIG. 4, a plurality of queue areas 410, 420, and 430 can be disposed in a designated space 400 on a map. At least a portion of the plurality of queue areas 410, 420, and 430 can be disposed close to a loading position of a robot which has completed its task.

Each of the plurality of queue areas 410, 420, and 430 can include a plurality of queues, which can have different lengths and dispositions. For example, referring to FIG. 4, the first and second queue areas 410 and 420 can have a plurality of queues disposed in a 3×3 configuration, and the third queue area 430 can have a plurality of queues disposed in 2×9 configuration different from the 3×3 configuration.

The server 100 can recognize locations of the plurality of queue areas 410, 420, and 430 and locations of the mounting areas, respectively.

Also, the server 100 can recognize whether or not robots occupy respective mounting areas within the plurality of queue areas 410, 420, and 430. For example, the server 100 can identify that three robots sequentially occupy mounting areas within right queues of the first and second queue areas 410 and 420, respectively, and one robot occupies the forefront of each of the two queues of the third queue area 430.

The server 100 can set a threshold range of predetermined distances at inside and outside of a boundary of a mounting area of each queue within the plurality of queue areas 410, 420, and 430, to determine whether a robot is occupying the mounting area of the queue. This reflects a problem that a robot is actually difficult to be located exactly in a mounting area even if the robot is mounted in the mounting area and operates in a queue mode. For example, if a location of a mounting area of a queue is not equal to a current location of a robot occupying the mounting area but a difference between the locations is not out of the set threshold range, it can be considered that the robot is occupying the mounting area.

The server 100 can calculate a departed distance of the robot from the mounting area, including the threshold range at the inside and outside of the boundary of the mounting area, and determine whether the robot has actually departed from the mounting area.

The server 100, for example, controls the succeeding robots within the queue to sequentially shift forward when it is determined that the task-assigned robot has actually departed from the mounting area.

Figure 5:
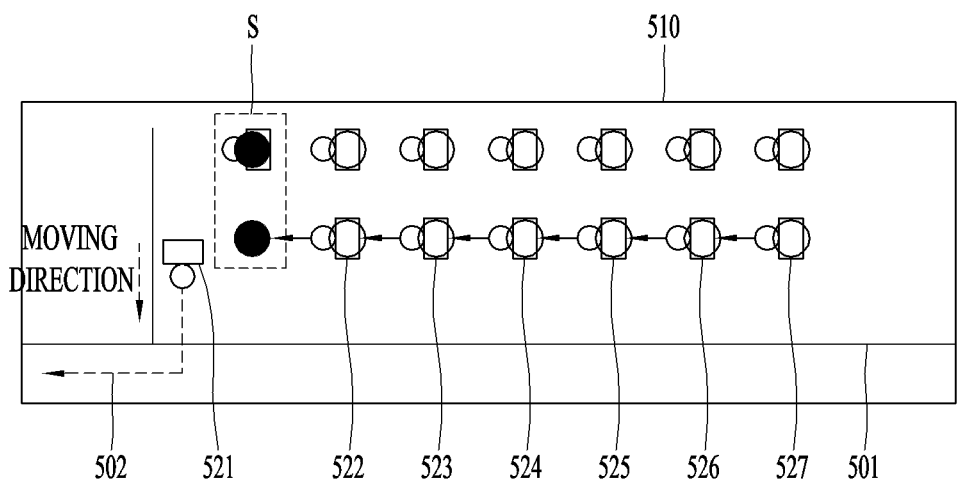
FIG. 5 is an exemplary view illustrating a general movement method of robots in a queue in accordance with an embodiment of the present disclosure.

FIG. 5 is an exemplary view illustrating a general movement method of robots belonging to a queue in a queue area 510 in accordance with an embodiment of the present disclosure.

As illustrated in FIG. 5, a forefront location of each of a plurality of queues is set to a task start point S. In this instance, when a task is assigned to a forefront robot 521 of one of the plurality of queues, the forefront robot 521 starts movement to perform the task and accordingly, a queue mode of the robot 521 is released. Afterwards, the forefront robot 521 travels along a travel route 502 which is set along a movement path 501 for performing the task.

The server 100 receives a signal corresponding to the queue mode release of the forefront robot 521, and finally confirms the departure from the forefront mounting area where the forefront robot 521 has occupied. When the departure of the forefront robot 521 is finally confirmed, the succeeding robots 522, 523, 524, 525, 526, and 527 shift forward.

Meanwhile, although not illustrated, when the length of the queue is zero (0) or close to 0, a rear robot in an adjacent queue can move to that queue to continuously maintain the plurality of queues. That is, even if the queue is shortened, the number of queues can be maintained, so as to assign tasks independently to the plurality of robots.

Assuming that a first mounting area of a queue has been set to a task start point, tasks are assigned simultaneously to robots located in first mounting areas of the plurality of queues, such that more tasks can be performed within a predetermined task time.

Also, if there is a sufficient space for disposing the queue area, it can be preferable to decrease lengths of queues and increase the number of queues. And, as the forefront position of each queue is set to a task start point, the number of robots to which tasks can be simultaneously assigned increases and the number of shifts decreases.

Figure 6:
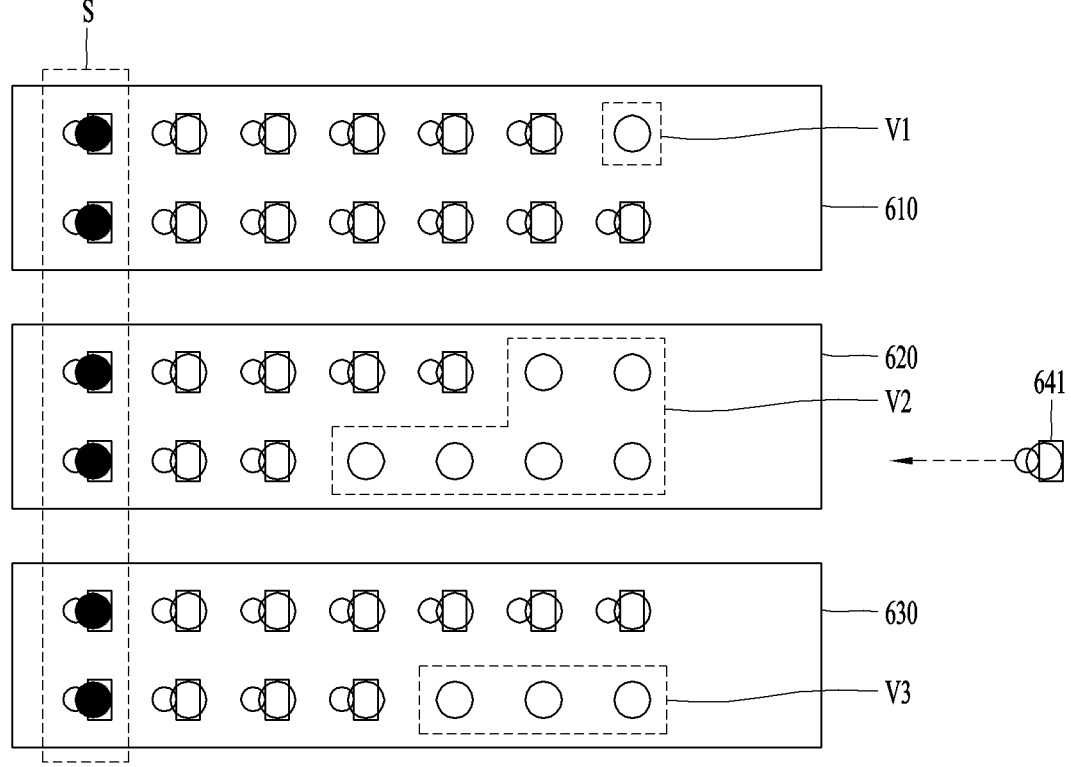
FIG. 6 is an exemplary view illustrating a method by which a robot that has completed a task enters a queue in accordance with an embodiment of the present disclosure.

FIG. 6 is an exemplary view illustrating a method by which a robot that has completed a task enters a queue again in accordance with an embodiment of the present disclosure.

When receiving a task end signal from a robot which has completed an assigned task, the server 100 can transmit a return command such that the robot returns to a queue of a queue area. The server 100 can sense that the robot is intended to enter the queue area, in response to the return command or after completing the assigned task.

The server 100 can then assign a mounting area within a queue in which the robot is to be located according to a preset condition. That is, the server 100 can select a queue that the robot is to enter, and assign the selected queue to the corresponding robot.

Here, the preset condition can be related to at least one of a current position of a robot to enter, and an occupancy rate of the robot within the queue of the queue area.

For example, the server 100 can select a queue close to the location of the robot to enter, at a time point when the robot to enter is to enter the queue area. Or, for example, the server 100 can select a queue, which has a low occupancy rate of the robot, among the plurality of queues in the queue area. Or, when the occupancy rates of the robot are similar, the server 100 can assign a mounting area of the queue, which is close to the current location of the robot to enter, as a location of the robot.

Referring to FIG. 6, the server 100 can sense that the task-completed robot 641 is intended to enter one of the plurality of queue areas 610, 620, and 630.

The server 100 determines a queue in which the robot is to be located, in response to a signal transmitted from the robot 641.

Specifically, the server 100 determines a queue, in which the robot 641 is to be located, based on the current location of the robot 641 and the robot occupancy rates for the plurality of queue areas 610, 620, and 630, or the number of vacant mounting areas V1, V2, and V3. For example, when close to the current location of the robot 641, the server 100 can transmit a movement command to the robot 641 such that the robot is located in an end (last) mounting area of a first queue of the queue area 620 having a low robot occupancy rate.

On the other hand, when each queue of the plurality of queue areas 610, 620, and 630 has a different length, the server 100 can calculate (check) the robot occupancy rate (%) based on an entire size of the queue area, and generate a movement command in a manner of filling robots, starting from a queue having a low occupancy rate according to a result of the calculation.

On the other hand, when the robot 641 to enter is mounted in the end mounting area after moving to the queue of the queue area assigned by the server 100, the robot 641 to enter operates in the queue mode. As illustrated in FIG. 5, the process of shifting along the front (preceding) robot when a robot located at the task start point S departs from its queue after a task is assigned to the robot is repeatedly performed.

When a signal indicating the switching to the queue mode is received from the robot which has mounted in the end mounting area of the queue, the server 100 then controls the corresponding robot as a group together with robots belonging to the queue to which the corresponding robot belongs.

Figure 7:
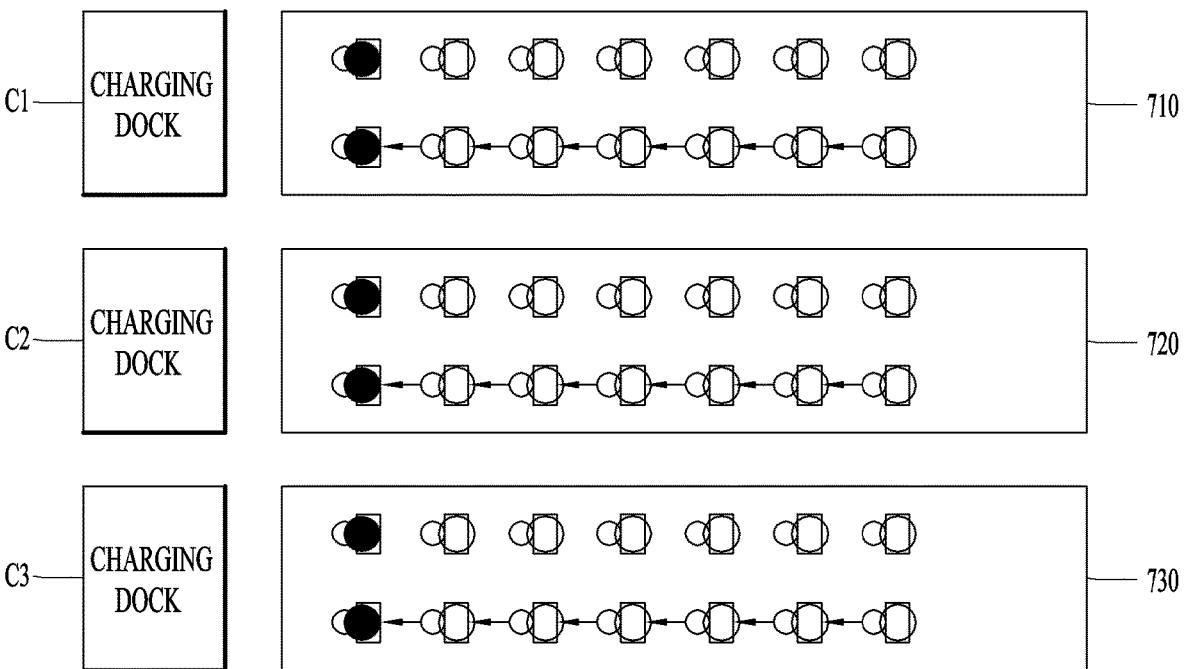
FIG. 7 is an exemplary view illustrating a state in which every robot has moved to a queue before charging, in accordance with an embodiment of the present disclosure.

FIG. 7 is an exemplary view illustrating a state in which every robot has moved to a queue before a charging process, in accordance with an embodiment of the present disclosure.

As illustrated in FIG. 7, it is illustrated that queue areas 710, 720, and 730 and charging docks C1, C2, and C3 are adjacent to each other, but it is merely illustrative for the sake of explanation, and the present disclosure is not limited to this structure. That is, it is enough that the plurality of queue areas 710, 720, and 730 and the charging docks C1, C2, and C3 are located at preset positions within a designated space.

Also, it can be assumed in the present disclosure that the robots within the plurality of queue areas 710, 720, and 730 operate in an environment in which they are used for 24 hours. In this case, considering a task end time and a next task start time, a charging process for robots can be performed within a time between the task end time and the next task start time. This can suppress the batteries of the robots within the plurality of queue areas 710, 720, and 730 from being discharged, such that all the robots can smoothly perform succeeding tasks.

First, as illustrated in FIG. 7, it can be seen that the robots, which have completed their tasks, are located in designated mounting areas in the plurality of queue areas 710, 720, and 730, respectively.

When all the robots within the plurality of queue areas 710, 720, and 730 are located in the mounting areas and each robot changes the operating mode to the queue mode, the server 100 can responsively start a charging process. That is, in the present disclosure, even if a charge request is not received from each robot or through a user input, when all the robots return to the queue areas and the operating mode is switched to the queue mode accordingly, the charging process can be automatically executed by the server 100.

The server 100 (see FIG. 1) can match charging docks in advance independently with the plurality of queue areas 710, 720, and 730. For example, the robots in the first queue area 710 are charged at the first charging dock C1, the robots in the second queue area 720 are charged at the second charging dock C2, and the robots in the third queue areas 730 are charged at the third charging dock C3.

Here, the charging docks C1, C2, and C3 that match the plurality of queue areas 710, 720, and 730, respectively, can be recognized as one group. This means that each of the charging docks C1, C2, and C3 includes a plurality of charging docks, for example, in proportion, namely, N:1, to the number of robots within each queue area 710, 720, and 730.

The server 100 can detect robots to be charged in the plurality of queue areas 710, 720, and 730, and control each of the detected robots to be charged to independently move to the matched charging docks C1, C2, and C3. That is, a charging event can be generated independently with respect to each of the plurality of queue areas 710, 720, and 730.

Therefore, the server 100 can simultaneously transmit a charging command for the robot to be charged in the first queue area 710, a charging command for the robot to be charged in the second queue area 720, and a charging command for the robot to be charged in the third queue area 730, and the respective robots to be charged can perform a movement event and a movement toward the charging docks independently according to the received charging commands.

On the other hand, the charging command for each of the plurality of queue areas 710, 720, and 730 corresponds to a series of tasks. Therefore, in each of the plurality of queue areas 710, 720, and 730, the robots to be charged move, one by one, out of the queue areas, to which they belong, toward the charging dock.

When a robot to be charged is completely charged, a full-charge signal can be transmitted from each charging dock C1, C2, C3 to the server 100. The server 100 can then transmit a charging command to the next robot to be charged in the corresponding queue area, in response to the full-charge signal. In this case, the robot which has fully been charged moves away from the charging dock toward its queue area according to its self-determination or a return command received from the server 100.

In the meantime, according to an embodiment, the server 100 can recognize a queue area including robots, which have all been fully charged, among the plurality of queue areas 710, 720, and 730. In this case, the server 100 can additionally selectively match the charging dock, which has matched the queue area for which the charging of the robots has been completed, with one of the remaining queue areas.

For example, when all the robots in the first queue area 710 have fully been charged, the server 100 can match the first charging dock C1 with the second queue area 720 or the third queue area 730, to control a charging process, such that a robot charging time for the remaining queue areas can be shortened. As another example, when all the robots in the first and second queue areas 710 and 720 have been fully charged, the server 100 can re-match all the charging docks C1, C2, and C3 with the third queue area 730 to rapidly perform charging for the robots within the queue area 730.

According to an embodiment, the server 100 can control the robots, which have been fully charged, in each of the plurality of queue areas 710, 720, and 730 to move back to their queue area.

In this case, the server 100 can transmit a return command to a fully-charged robot to move back to its queue area from which it has departed. Or, as illustrated in FIG. 6, the server 100 can transmit a control command such that the fully-charged robot returns to a queue area, which has a shorter queue, among the plurality of queue areas 710, 720, and 730.

Figure 8:
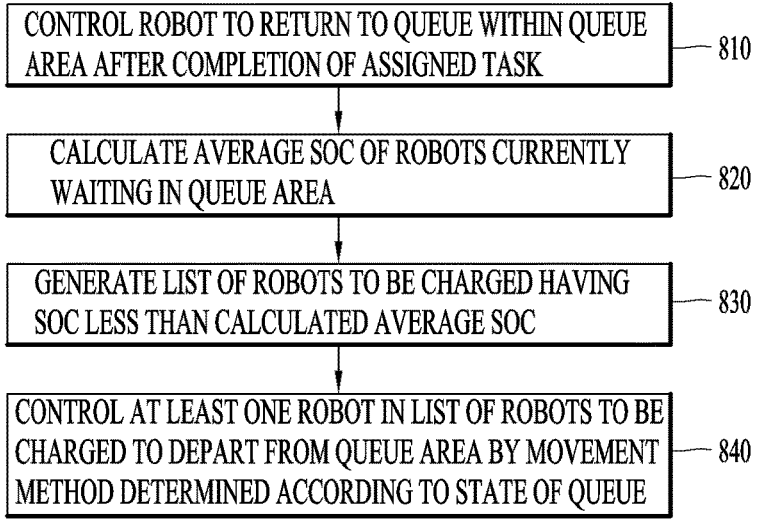
FIG. 8 is a flowchart illustrating a method of charging robots in a queue in accordance with an embodiment of the present disclosure.

FIG. 8 is a flowchart illustrating a method of charging robots in a queue in accordance with an embodiment of the present disclosure.

The steps of the flowchart illustrated in FIG. 8 can be performed by the server 100 (FIG. 1) or the processor of the server 100 and/or a processor of a device interoperating with the server. To this end, the server can communication a plurality of robots that operate in a designated space on a map. For example, each of the plurality of robots can transmit battery information to the server, and the server can determine whether or not charging is required on the basis of the received battery information.

Referring to FIG. 8, the server can recognize that a task-assigned robot returns to its queue of a queue area after the assigned task is completed (810).

In this case, the server can start the charging process.

The charging process can be started when all the robots return to the queue within the queue area after all the tasks are completed or after the end of a set task time. In this case, that is, the server can automatically recognize that there is a charge request. This has been already described with reference to FIG. 7.

Or, the charging process can be carried out based on a user input (with respect to the robot). Even in this case, the server can recognize that there is a charge request for robots in a queue area.

In an embodiment, the recognition of the charge request can be independently performed for the queue area or each of N queues within the queue area. For example, referring to FIG. 7, the server 100 (FIG. 1) can first perform the charging process for the first queue area 710. Or, although not illustrated in FIG. 7, even if all the robots in the first queue area 710 return, the server 100 can alternatively perform the charging process independently for a specific queue (e.g., the first queue) within the first queue area 710.

When the charging process is started, a charging operation can be performed for some or all of the robots within the queue area.

On the other hand, when a new task is started during a charging operation, the server 100 can terminate the robot charging process and assign a new task to the robots within the queue area. In this instance, a robot which is being charged can return to the queue area after the charging is completed, and waits for assignment of a next task.

The server 100 can compute an average of State of Charge (SoC) values of the robots which are waiting in the queue area (820).

Here, SoC is the percentage of a currently-available battery level with respect to an entire capacity, to indicate a remaining battery level of a robot. The SoC can be measured by using one of chemical measurement, voltage measurement, current integration, and pressure measurement.

The chemical measurement is a method of measuring SoC by computing a weight or acidity (pH) of an electrolyte of a battery, namely, a measurement method applicable to a rechargeable battery that a liquid electrolyte is directly accessible. The voltage measurement is a method of measuring SoC by measuring a battery voltage and comparing the voltage with a discharge curve. The current measurement is also called coulomb counting, and is a method of measuring SoC by measuring a current of a battery and integrating the current on the time basis. The pressure measurement, for example, is applied to measure a remaining battery level of a nickel hydride battery, and is a method of measuring SoC by measuring internal pressure of the battery.

Through the SoC measurement of the battery, a maximum charge amount of the battery can be set to be lower than a maximum point (Max) of SoC, and a minimum charge amount of the battery can be set to be higher than a minimum point (Min) of SoC. Accordingly, various problems, such as safety accidents due to overcharge or overdischarge of the battery can be suppressed, and thus the SoC measurement is very important. Also, through the SoC measurement, it can be predicted how much longer the battery can be used. Also, the SoC can be used as a reference for determining a time point for charging or stopping charging of the battery.

The SoC measurement of the battery can be performed by a processor of each robot within the queue area. Since the robots within the queue area can have various specifications, a detailed description for the SoC measurement of the battery of each robot will be omitted herein.

Each of the robots within the queue area (or a robot, which has sent a charge request, among the robots within the queue area) can transmit an SoC measurement result to the server. The server can match the received SoC measurement result with identification information of the corresponding robot, and computes an average SoC value based on the received SoC measurement result.

The average SoC value can be performed independently with respect to each of the plurality of queue areas. For example, if the server receives a measurement value of 34% from Robot1, 50% from Robot2, and 62% from Robot3 within the first queue area, the average SoC value of the first queue area is expressed as follows.

Average SoC value=(Sum of received SoC measurement results)/(Number of robots that have sent SoC measurement results)=(35%+50%+62%)/3=49%.

That is, the average SoC value of Robot1, Robot2, and Robot3 is 49%.

In another embodiment, the server can compute the average SoC value based on the SoC measurement results of the entire robots in the plurality of queue areas. In this case, the server can perform the charging process for all the robots within the plurality of queue areas, aiming at the same average SoC value.

The server 100 then generates a list of robots to be charged, of which SoC measurement results are less than the computed average SoC (S830). That is, the server 100 can generate a list of robots to be charged, to detect the robots to be charged among the robots which are waiting within the queue areas.

Here, the robots included in the list of robots to be charged indicate robots, which have a remaining battery level that is less than the average SoC value, among the robots within the queue areas. The list of robots to be charged can be configured to include identification information and SoC measurement result information related to the robots which have the SoC measurement results less than the average SoC value. Hereinafter, the list of robots to be charged is referred to as a list or the list, but is used to indicate the same list.

The list can be stored in the memory 130 of the server 100 or a storage device interoperating with the server 100. Also, the list can be updated to more include robots of which remaining battery level lowered over time is less than the average SoC value.

The list can also include information related to the order of charging the robots within the list. To this end, the server 100 can determine the charging order based on at least one of locations of mounting areas, distances from the charging docks, a disposition state of queues, and differences from the average SoC value, in relation to the robots within the list.

Also, the server 100 can update the list according to whether a corresponding robot is charged (e.g., excluded from charging, etc.) or a charging order that is changed, on the basis of a user input or a request by at least one of the robots within the list.

Although not illustrated, in several embodiments, the robots included in the list can be notified to be visually distinguished from other robots which are waiting in the queues. For example, an LED color (e.g., red LED light), visual information, and the like of the robots included in the list can be output to be visually different from those of other waiting robots through an appropriate output element (e.g., LED light output element, a display, etc.) Accordingly, the user can intuitively distinguish the robots to be charged within the queue areas.

When the list is generated, the server 100 can then control the robots within the list to moved away from the queue areas by a movement method determined according to the queue state (840).

That is, the server 100 can determine a movement method for controlling the robots to move out of the queue areas, according to the state of the queues to which the robots included in the list belongs (e.g., a disposition of the queues, positions of mounting areas of the robots to be charged, etc.).

Here, the movement method of the robots to be charged according to the queue state is determined by selecting the most appropriate movement method for the current queue state from selectable movement methods. The movement of the robots within the list according to the queue state includes not only the movement of the corresponding robots but also movement of neighboring robots that are supposed to move simultaneously or sequentially when the movement according to the determined method is made.

In an embodiment, the robots included in the list can depart from their queues by considering the shortest routes for departing from the queue area, and the minimum number/range of neighboring robots supposed to move simultaneously or sequentially, as well as the queue state.

Hereinafter, detailed examples of the different movement methods of the robots included in the list, determined according to the queue state, will be described in detail with reference to FIGS. 9 to 11.

When a movement start event of a robot within the list according to the determined movement method is generated, the server 100 recognizes the queue mode release corresponding to the movement start event, and determines whether the corresponding robot has departed from the mounting area.

Whether the robot has departed from the mounting area can be determined by comparing a degree (distance) that the current location of the robot to be charged has departed from the mounting area previously-memorized in the server 100.

In detail, it is assumed that the server 100 continuously receives the current location of the robot in the list and the current location of the robot in the list corresponds to a bottom center point of the robot. It is also assumed that the server 100 previously stores and memorizes location and size of the queue area, and location information regarding each mounting area of the queue area.

In this case, when the movement start event of the robot in the list and/or the queue mode release corresponding to the event are/is recognized, the server 100 can compare coordinates (or center point) of the corresponding mounting area with coordinates of the current location of the robot to be charged, and determine that the robot has departed from the mounting area when a distance between the two coordinates exceeds a reference value according to a result of the comparison. On the other hand, when the distance between the coordinates is within the reference value according to the result of the comparison, the server 100 can determine that the robot in the list is still occupying the mounting area.

In another embodiment, whether the robot has finally departed from the mounting area can alternatively be determined based on an analysis of an image captured through a camera sensor disposed on the robot in the list or a robot behind the robot in the list. For example, the server 100 can determine whether the robot in the list has actually departed from its mounting area based on whether an occupancy rate that the robot occupies the mounting area is equal to or greater than a reference value (e.g., 60%).

As such, in the present disclosure, whether the robot to be charged has actually departed from its mounting area can be accurately confirmed without an error by primarily recognizing the queue mode release in response to the movement start event of the robot to be charged, and secondarily determining the departure or non-departure from the mounting area on the location basis.

When it is confirmed that the robot has departed from the mounting area, the server 100 can transmit a control command for forward shifting if there is a succeeding robot behind the robot departed from the mounting area. In this instance, the forward shifting of the succeeding robot is carried out in the same or similar manner to that described above with reference to FIGS. 3 and 5.

When there are a plurality of robots to be charged within the queue area, a charge command and a movement command for charging can be sequentially transmitted by the server 100. That is, the charge command and the movement command are transmitted to one robot at a time in one queue area.

However, depending on an embodiment, when there are a plurality of queue areas, the charge command and the movement command can be independently transmitted for each of the plurality of queue areas.

Similarly, when a charging process is independently performed for each of a plurality of queues within one queue area, the charge command and the movement command for robots within each queue can be independently performed without interference. However, when robots to be charged move in each of a plurality of queues adjacent to each other within one queue area, the server 100 can determine whether a collision condition between the robots to be charged within the adjacent queues, transmit a command to one of the robots to be charged to stand by for a while, and control the robots to be charged to sequentially move.

Figure 9:
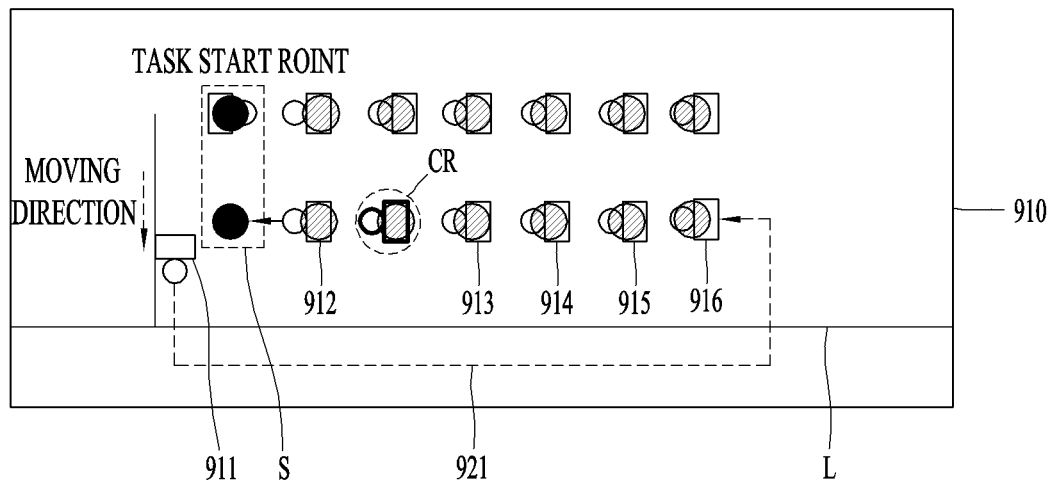
FIGS. 9 to 11 are exemplary views illustrating a method of controlling different queues when there are robots to be charged, in accordance with an embodiment of the present disclosure.
Figure 10:
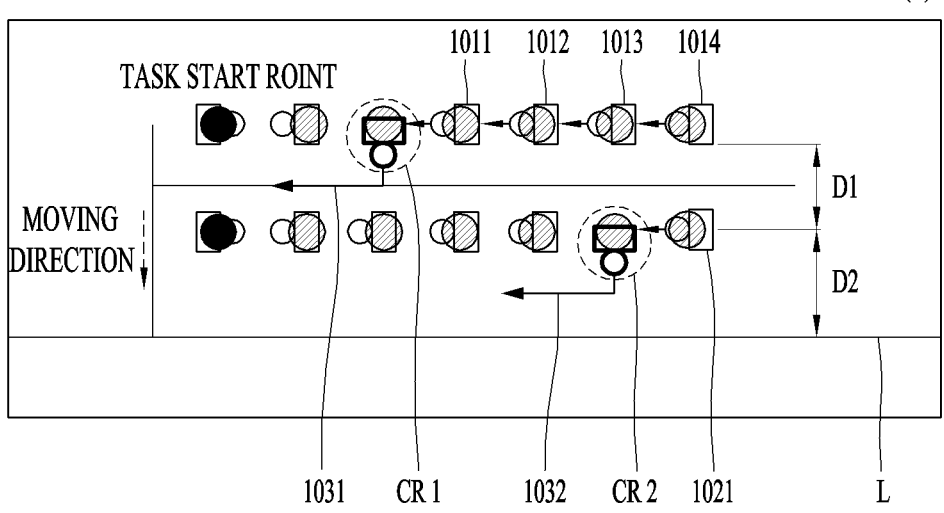
Figure 11:
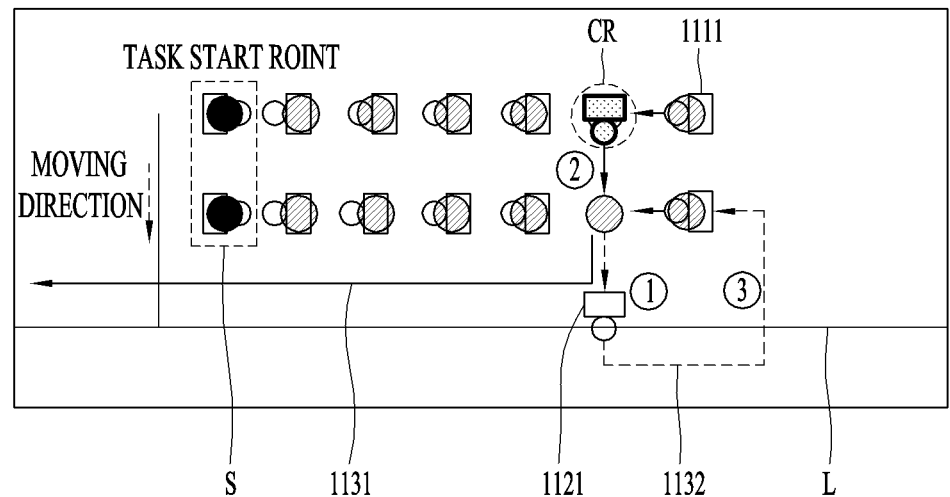

FIGS. 9 to 11 are exemplary views illustrating different queue control methods when there are robots to be charged, in accordance with an embodiment of the present disclosure.

In detail, FIG. 9 illustrates a case where a queue to which the robot within the list belongs is in a sequential movement-available state (hereinafter, referred to as 'first movement method')

FIG. 10 illustrates a case where a queue to which the robot within the list belongs is apart from an adjacent queue by a distance enough to form a movement space (hereinafter, referred to as 'second movement method').

Also, FIG. 11 illustrates a case where a queue to which the robot within the list belongs has at least one adjacent queue and spaced apart by a narrow distance from the adjacent queue (hereinafter, referred to as 'third movement method').

Hereinafter, the first movement method will first be described with reference to FIG. 9.

The server 100 can control front robots of queues in which the robots within the list are located to sequentially move in a first direction and a robot to be charged to move in the same direction as the front robots so as to depart from the queue area. In this instance, the first direction indicates a direction toward the front side of a robot operating in the queue mode or a task start point S.

Specifically, in FIG. 9, the robot CR within the list can be located at the foreword part (e.g., a third position from the front) of a boundary queue of a queue area 910.

In this case, the server 100 controls a forefront robot 911 of the queue, to which the robot CR within the list belongs, to depart from the current queue, and robots 912, CR, 913, 914, 915, 916, which are located after the robot 911, to sequentially shift forward, based on the task start point S of each queue.

In this instance, among the robots which have departed from the current queue, the robots 912, 913, 914, 915, 91, except for the robot CR within the list, move to the rear side of the queue (921) and repeat shifting.

When the robot CR within the list is located at the forefront of the queue based on the task start point S of the queue, the robot CR within the list, unlike the other robots, directly moves to a matched charging dock along a set movement path L, to perform charging.

On the other hand, when there is not any robot to shift forward, the movement control of the queue for the robot CR within the list is terminated. The server 100 starts the movement control in the queue for the next robot to be charged within the list in the queue area 910, in response to a reception of a signal notifying the completion of charging for the robot CR within the list from the charging dock.

On the other hand, in FIG. 9, when the robot CR within the list is currently located at the rear part of the queue and belongs to a boundary queue, the server 100 can control the corresponding robot to depart from the queue area after in-place rotation toward the outside of the queue area (hereinafter, referred to as 'fourth movement method'). In this instance, there should not be a collision possibility while the robot CR is traveling forward until reaching the set movement path L after the in-place rotation in the current mounting area.

Through the fourth movement method, the moving operation of the other robots within the queue for the movement of the corresponding robot can be minimized. However, even in this case, the server 100 controls robots behind the corresponding robot to shift forward based on the mounting area from which the corresponding robot has departed.

Hereinafter, the second movement method will be described with reference to FIG. 10.

When the queue to which the robots within the list belong is in a state having a space in which a spacing between queues is equal to or greater than a threshold distance, the server 100 can control the corresponding robot to depart from the queue area by moving along a second direction between the queues.

Here, the threshold distance can be set to a value obtained by adding a diameter of a bottom surface of the robot and a margin length, and it is determined whether the space of the threshold distance or more is defined based on a minimum distance between the queues. This assumes a case where another robot within the queue slightly departs from the mounting area within a margin range (i.e., a case where the distance between the queues differs depending on locations).

Here, the second direction indicates a direction following the set movement path L after passing through the space between the queues. That is, the second direction indicates a direction in which the robot within the list moves between the queues until departing from the queue area.

In this instance, a distance D1 between the queues is set to define the space of the threshold distance or more. In this instance, when the queue is a boundary queue without an adjacent queue and includes a space where robots can move along the boundary, a distance D2 can also be included in the case where the distance defines the space of the threshold distance or more between the queues.

The distance D1 between the queues can be calculated based on distance information between mounting areas facing each other in the adjacent queues. Also, when it is assumed that the robot to be charged within the queue departs in a lateral direction, the distance D2 can also be calculated based on distance information between the mounting area and the departed robot. For example, the distances D1 and D2 can be manually input through a user input, or can be calculated by location shift setting through a rotation of specific robots in the corresponding queues (e.g., robots located at the task start points).

In FIG. 10, if the space defined by the distance D1 is a first path section 1031 and the space defined by the distance D2 is a second path section 1032, the server 100 controls first and second robots CR1 and CR2 to depart from the queue area through the first and second path sections 1031 and 1032.

Afterwards, the first and second robots CR1 and CR2 move to the charging docks along the set movement path L, and the server 100 controls robots 1011, 1012, 1013, and

1014 behind the first robot CR1 and a robot 1021 behind the second robot CR2 to shift forward.

If the distances D1 and D2 are calculated to be less than the threshold distance, the first and second path sections are not made. Therefore, the robot to be charged is controlled to depart from the queue area according to the aforementioned first or fourth movement method or the third movement method to be explained later.

Meanwhile, when a plurality of queues are included in one queue area, each queue can have a different length. In this instance, when each queue has a different length or robots to be charged are located at a predetermined distance or more from each other even if the queues have the same length, the charge command and the movement command for the first and second robots CR1 and CR2 of FIG. 10 can be performed simultaneously or independently.

This results from that if there is no collision risk between the robots to be charged at an intersection, it is allowable to simultaneously or independently transmit the charge command and the movement command for the first and second robots CR1 and CR2. In this instance, when the charging docks that match the first and second robots CR1 and CR2 which were located in different queues are equal to each other, a robot to be charged which has arrived late at the charging dock can stand by in the vicinity the charging dock.

Hereinafter, the third movement method will be described with reference to FIG. 11.

The server 100 can control the robot within the list to move, in a direction departing from the queue area, together with a neighboring robot of a boundary queue neighboring to the current mounting area of the robot in the list. The server 100 can then control the neighboring robot to move in a second direction entering an end of the boundary queue while the corresponding robot moves in a first direction toward the charging dock.

Referring to FIG. 11, the queue where the robot CR to be charged is located within the queue area can be located at an inner side of the boundary queue. The queue state to which the robot CR belongs can be a case where the distance between the queues defines a space of the threshold distance or less so as not to generate a path section and the robot CR is located at the rear part of the queue based on the task start point of the queue area.

In this case, the server 100 can control the movement of the plurality of robots such that the robot CR departs from the queue area together with the matched neighboring robot in the neighboring queue from the current mounting area of the robot CR up to the boundary queue.

Specifically, a neighboring robot 1121, which is located at the same location as the robot CR in the boundary queue neighboring to the queue of the robot CR, rotates in place together with the robot CR, and the neighboring robot 1121 and the robot CR move sequentially to the outside (①) and ②)). Afterwards, the server 100 controls the neighboring robot 1121 to move along a path 1132 toward an end of the queue to which the robot 1121 has belonged (③)) and the robot CR to move toward the charging dock along the set movement path L. The server 100 controls a robot behind the neighboring robot 1121 and a robot 1111 behind the robot CR to shift forward in their queues.

As such, after the robot to be charged moves to the charging dock according to the appropriate movement method determined based on the state of the queue to which the robot belongs, the server 100 can control the robot to be charged until reaching the average SoC. To this end, the server 100 can receive an SoC measurement result from the robot and/or communicate with the charging dock to receive a signal notifying that the SoC of the robot to be charged has reached the average SoC.

That is, the completion of charging in the present disclosure can mean that the SoC of the robot to be charged has reached the average SoC or a target SoC to be explained later. In this instance, when the SoC of the robot which is being charged reaches the average SoC or the target SoC, each charging dock can transmit a signal notifying the completion of the charging to the server 100, and the server 100 can transmit the charge command and the movement command to the next robot to be charged in the list, in response to the charging completion signal.

Meanwhile, the first to fourth movement methods of the robots, which have been described in the different embodiments of the present disclosure with reference to FIGS. 9 to 11, will be applied similarly to embodiments in which a specific robot with a task assigned thereto moves after departing from a queue area.

Specifically, when a specific robot to which a task is assigned is a robot located in the middle of a queue other than a first robot located at a task start point, the server 100 can control the specific robot to depart from its queue area to move to a location corresponding to the assigned task by any one of the first to fourth movement methods, which is determined according to the queue to which the specific robot belongs.

As described above, in a robot control system and a robot control method according to an embodiment of the present disclosure, a charging process for a plurality of robots is integratively performed in a queuing manner, a robot to be necessarily charged in a queue is selected in an optimal manner, and various movement methods are selectively provided such that the selected robot can depart from the queue in a manner appropriate for a current state of the queue and move to a charging dock.

Figure 12:
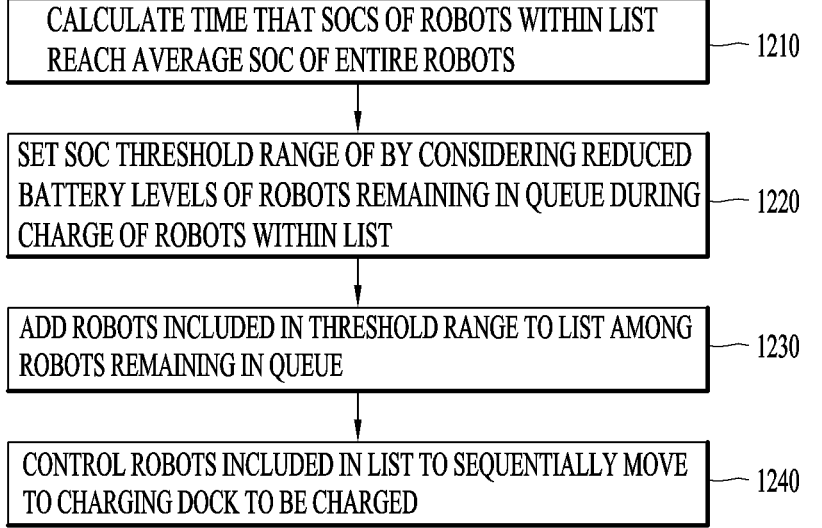
FIGS. 12 and 13 are different flowcharts illustrating a method of charging robots in a queue in accordance with an embodiment of the present disclosure.

Hereinafter, FIG. 12 is another flowchart for explaining a robot charging method in queues. The flowchart of FIG. 12 can be included in the list generation step (830) of FIG. 8 and/or can be performed continuously after the movement control step (840). Also, the steps of the flowchart illustrated in FIG. 12, similar to those in FIG. 8, can be performed by the server 100 (FIG. 1) or the processor of the server 100 and/or a processor of a device interoperating with the server.

Each step of the flowchart of FIG. 12 can be additionally performed in the list generation step (830) of FIG. 8.

In detail, the server 100 (FIG. 1) can calculate a reduction of a battery level (a reduced SoC) of each robot which is still located in the queue area while the robot to be charged within the list is being charged (1210). In other words, the server 100 can predict a degree that the battery level of each robot staying in the queue is lowered, compared to a charge completion time of every robot to be charged in the list.

To this end, the server can store, in the form of a table, an SoC variation of the robot over time and a reduction of the battery level of the robot over time in the memory 130 in advance, and call such information, if necessary, to use for computing the reduction of the battery level of each remaining robot.

The server 100 can also set an SoC threshold range based on the computed reduction of the battery level of the remaining robot (1220). Specifically, the server 100 can set the SoC threshold range based on an average SoC value and the sum of the reduced battery levels for a predicted charge time until all the robots to be charged reach the average SoC value.

A minimum value of the SoC threshold range can be the average SoC value. That is, the SoC threshold range can be at least equal to or greater than the average SoC value. Also, the maximum value of the SoC threshold range can be a maximum SoC value (e.g., 80%) that is allowed for the safety of the battery.

The SoC threshold range can vary from a reference value in proportion to the number of robots to be charged within the list and a predicted charge time. In this instance, the reference value can be a value obtained by adding a predetermined constant to the average SoC value.

For example, the degree that the battery level of the remaining robot is lowered can be increased as a large number of robots to be charged is included within the list and a predicted charge time is long. Therefore, the SoC threshold range can be set to be larger than the reference value. On the other hand, for example, the battery level of the remaining robot can be less lowered as a small number of robots to be charged is included within the list and a predicted charge time is short. Therefore, the SoC threshold range can be set to be equal to or smaller than the reference value.

The server 100 detects a robot, which is not any of robots to be charged included in the set SoC threshold range, namely, is not included in an initial list but has transmitted an SoC measurement result within the set SoC threshold range, and adds the detected robot to the list (1230).

For example, the server 100 can detect robots within a queue, which exceed an SoC of 49% as the average SoC value computed in the example of FIG. 8 but does not reach the SoC threshold range, for example, 52%, and insert the detected robots into the list.

The server 100 then controls all the robots to be charged, included in the list, to sequentially move to the charging dock for charging (1240). To this end, the server 100 transmits a charge command and a movement command to the robots to be charged in a set order. The robots to be charged then receive the charge command and the movement command from the server 100, and sequentially move to the charging dock to be charged.

In this instance, the newly-added robots to be charged are included in the list in a subsequent charge order. For example, the robots to be charged that are initially included in the list can be designated as a first group and the newly-added robots to be charged through the step 1230 of FIG. 12 can be designated as a second group.

In this instance, when it is not an exceptional situation (e.g., when an SoC threshold range of robots to be charged, belonging to the second group, is equal to or very similar to the average SoC value and is located closer to a charging dock than the next robot to be charged, belonging to the first group), the server starts to charge the robots to be charged, belonging to the second group, after completely charging the robots to be charged, belonging to the first group.

According to an embodiment, when all the robots to be charged within the list, in which the newly-added robots to be charged are included, are completely charged, the server 100 repeatedly performs the charging process by setting a target SoC based on a next task start time.

As described above, in a robot control method according to an embodiment of the present disclosure, an optimal integrated charging process for a plurality of robots within queues is automatically provided through a server, by considering battery states and next task time of the plurality of robots within the queues. Such method is more efficient since a manual user input for charging is not required.

Figure 13:
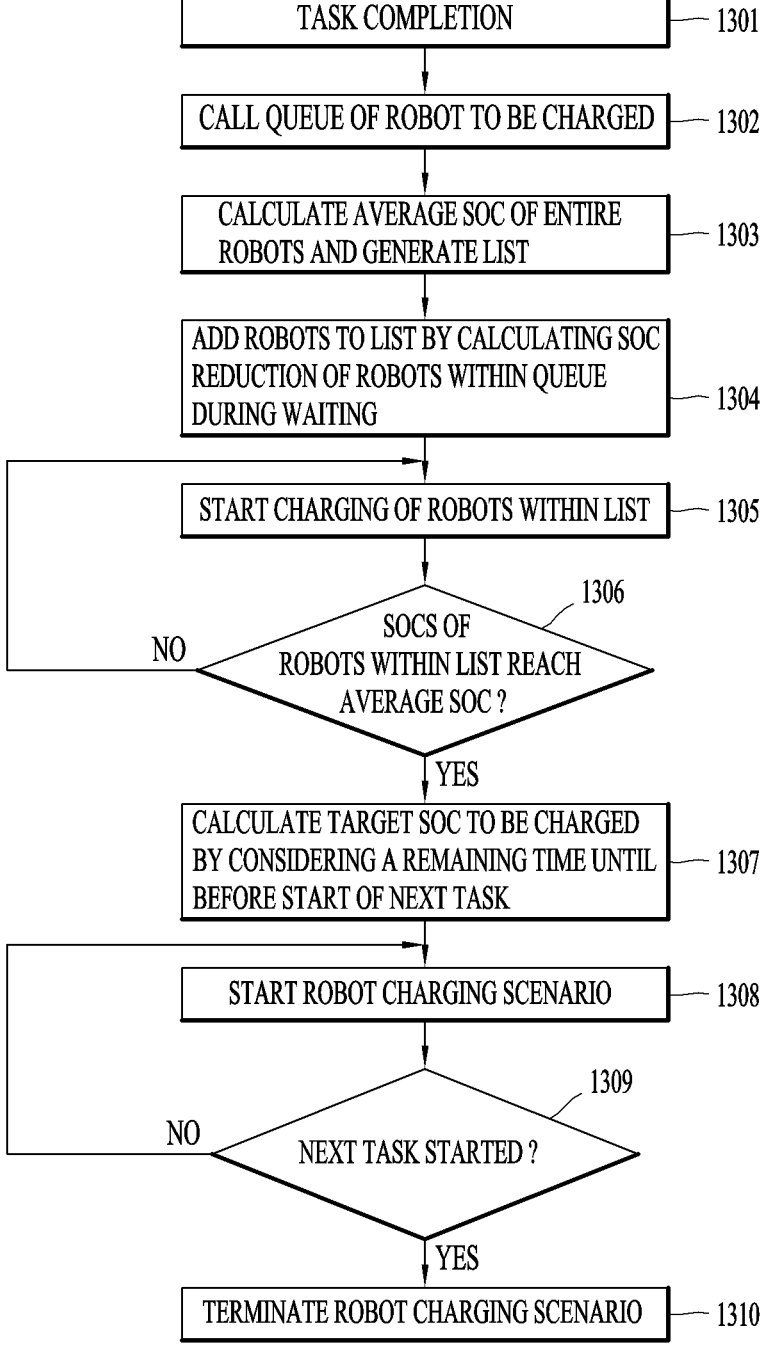

FIG. 13 is another flowchart for explaining a robot charging method in queues. The steps of the flowchart illustrated in FIG. 13, similar to those in FIG. 8, can be performed by the server 100 (FIG. 1) or the processor of the server 100 and/or a processor of a device interoperating with the server.

Referring to FIG. 13, the server can first recognize that respective tasks assigned to the plurality of robots have all been completed (1301).

Here, the assigned tasks can be different for each of the plurality of robots, and a completion time point of each assigned task can also be different. When each robot completes the assigned task, the robot can transmit a task completion signal to the server 100. The server 100 can then transmit a movement command, in response to the reception of the task completion signal, such that the robot returns to its queue area.

When the robots return to the queue area after the completion of the assigned tasks, the server can then transmit a call signal to the queues of the robots to be charged (1302). Specifically, the server 100 can recognize the return of all the robots at a time point that the plurality of robots enter their queues and/or are switched to the queue mode after entering the queue area and transmit a call signal to all the robots in the queue area or the queues.

Here, the call signal can include a request signal for information related to remaining battery levels, namely, the SoC values of the robots returned to the queue area.

The server then computes an average SoC of all the robots within the queue area, detects robots, which do not reach the average SoC, namely, robots to be charged, and generates a list of robots to be charged (1303).

Specifically, the server 100 can compute an average SoC by dividing each SoC of all the robots within the queue area by the number of robots, extract robots to be charged, which have remaining battery levels less than the average SoC, and generate a list including identification information related to the robots to be charged.

Continuously, the server 100 computes an SoC reduction of each of robots waiting within the queue area until the robots to be charged within the list are all completely charged, and adds the waiting robots of which SoC reduction does not reach the average SoC to the list based on the computing time point (1304).

That is, the robots to be charged, newly added to the list, indicate robots to be charged that currently remaining battery levels exceed the average SoC value but are to be lowered less than the average SoC value within a predicted charge completion time.

In this instance, the robots to be charged, newly added to the list in the step 1304, can be set to be charged subsequently in subsequent order after completely charging the robots to be charged, which are included in the initial list. For example, the server 100 can register the robots to be charged, included in the initial list, as a first group, register the robots to be charged, newly included in the list through the step 1304, as a second group. When the charging for the first group of robots to be charged is completed, the server 100 can start to charge the second group of robots to be charged.

As another embodiment, the server 100 can determine a charge order, based on positions of mounting areas of the robots to be charged within the queue, without a distinction of the first group and the second group.

Specifically, the server 100 can set a charge order, such that the shortest movement path for charging all the robots to be charged within the list is set or robots located at the front are charged earlier for visual stability. This assumes, as will be described later, that the current SoC value is irrelevant because all the robots to be charged within the list perform charging until their SoC values reach the average SoC value.

On the other hand, when the charging for the robots within the list is started (1305), a target robot to move to a charging dock departs from the queue area and moves toward the charging dock according to a movement method determined based on the current queue state and the position of the target robot. The movement method of the robot to be charged determined according to the queue state have been described in detail with reference to FIGS. 9 to 11.

The server can perform the charging through communication with the charging dock and the robots until the robots within the list, namely, the SoC values of the robots to be charged within the list reach the average SoC value, and controls completely charged robots to return to the queue area.

The server can determine whether the SoC of each of the robots to be charged within the list reaches the average SoC value (1306). In this instance, the SoC values of the completely charged robots to be charged are reduced again over time. The SoC reduction increases as a large number of robots to be charged is included in the list and/or a predicted charge time is long. Therefore, the server 100 can compare (determine) whether an SoC reduction of a robot to be charged, which has been first charged, in the list exceeds a set value (e.g., 15% of the average SoC value), and repeat the steps 1305 and 1306 based on a result of the comparison, starting from the robot which has been first charged.

According to the determination, the server repeats the step 1305 when the charging for the robots within the list does not reach the average SoC.

When the charging for the robots within the list reaches the average SoC according to the determination, the server 100 computes a new target SoC by considering a remaining time until before the start of a subsequent task (1307). Here, the new target SoC can be computed as a value that exceeds the existing average SoC value and can increase the average SoC of the entire robots as much as possible by considering a predicted subsequent task start time.

When the new target SoC is computed, the charging is sequentially performed for all the robots within the queue (1308). Here, sequentially performing the charging, as illustrated in FIG. 5, can include processes of moving a robot located at the front within the queue to a position (i.e., charging dock) according to a command, shifting subsequent robots forward, and moving a completely charged robot to newly enter an end of the queue.

The server 100 determines whether tasks for the robots within the queue have started (1309), and continues or terminates a charging scenario based on the determination.

Specifically, when it is determined that the charging for the robots within the queue has started, the server 100 terminates the charging scenario (1310), and assigns tasks to the robots within the queue. On the other hand, when it is determined that subsequent tasks for the robots within the queue have not started, the server can continuously perform the charging scenario (1306), and compute the next target SoC, if necessary, to perform the charging process.

As described above, in a robot control system and a robot control method according to embodiments of the present disclosure, when a plurality of robots operate in a designated space, the plurality of robots within a queue can be controlled and managed as one group, efficient waiting associated with task assignment and a charging process can be provided integrally. Also, when a task-assigned robot is moved out of a queue, a robot to which the next task is to be assigned automatically stands by at an optimal location. This can allow a fast task assignment and even visually-stabilized queue management. Robots which have completed their tasks can sequentially enter the queue to perform subsequent tasks or charging, and an optimal charging process can be executed without a user's manual input, by considering battery states and subsequent task time of the robots within the queue. In addition, a movement method of the robots within the queue can be applied to be appropriate for a state of the queue, which can result in performing flexible and fast individual robot control even while the plurality of robots are controlled as a group.

Further scope of applicability of the present disclosure will become apparent from the detailed description. It should be understood, however, that the detailed description and specific examples, such as the preferred embodiment of the disclosure, are given by way of illustration only, since various changes and modifications within the spirit and scope of the invention will be apparent to those skilled in the art.

Features, structures, effects, and the like described in those embodiments are included in at least one embodiment of the present disclosure, and are not necessarily limited to only one embodiment. Furthermore, features, structures, effects, and the like illustrated in each embodiment can be combined or modified with respect to other embodiments by those skilled in the art to which the embodiments belong. Therefore, contents related to such combinations and modifications should be construed as being included in the scope of the present disclosure.

In addition, the foregoing description has been made with reference to the embodiments, but it is merely illustrative and is not intended to limit the present disclosure. It will be apparent that other changes and applications can be made by those skilled in the art to which the present disclosure belong without departing from substantial features of the embodiments of the present disclosure. For example, each component specifically shown in the embodiments can be modified and practiced. And it should be construed that differences relating to such changes and applications are included in the scope of the present disclosure defined in the appended claims.

What is claimed is:

1. A method performed by a server configured to communicate with a plurality of robots, the method comprising:

forming a queue of the plurality of robots;

assigning a task to a task-assigned robot among the plurality of robots within the queue;

releasing a queue mode of the task-assigned robot when the task-assigned robot departs from the queue of the plurality of robots;

shifting at least one or more robots among the plurality of robots within the queue forward by checking an occupancy rate for a forward part of the queue, in response to a departure of the task-assigned robot from the queue;

computing an average State of Charge (SoC) of robots within a queue area corresponding to the queue;

generating a list of robots to be charged, each robot on the list of robots to be charged having a SoC less than the average SoC;

determining a movement method for moving away at least one of the robots to be charged from the queue area so that a minimum number of neighboring robots of the at least one of the robots to be charged move;

controlling the at least one of the robots to be charged within the list of robots to be charged to move away from the queue area by the movement method, wherein the controlling the at least one of the robots comprises:

controlling the at least one of the robots to be charged within the list of robots to be charged to move in a direction departing from the queue towards a neighboring robot, wherein the at least one of the robots to be charged moves together with the neighboring robot of at least one neighboring queue based on a mounting area of the at least one of the robots to be charged according to the movement method; and controlling the neighboring robot, after departing from the at least one neighboring queue, to enter an end of the at least one neighboring queue or an end of the queue while the at least one robot to be charged moves along a designated direction after departing from the queue area.

2. The method of claim 1, wherein the releasing the queue mode of the robot comprises:

sensing a generation of a movement start event by the task-assigned robot; and releasing the queue mode of the task-assigned robot by checking a departed distance of the task-assigned robot from a mounting area, in response to the sensing the generation of the movement start event.

3. The method of claim 2, further comprising:

sensing that the task-assigned robot is to enter the queue after completion of the task; and assigning a mounting area within the queue, in which the task-assigned robot is to be located after completion of the task, according to a preset condition, wherein, after the task-assigned robot completes the task, the task-assigned robot moves to the assigned mounting area and switches into the queue mode.

4. The method of claim 3, wherein the preset condition is related to at least one of the occupancy rate of the robots within the queue and a current position of the task-assigned robot to enter.

5. The method of claim 1, further comprising;

controlling the task-assigned robot to return to the queue area after completion of the task.

6. The method of claim 1, wherein the controlling is configured to control the at least one of the robots to be charged within the list of robots to be charged to depart from the queue area by moving between adjacent queues within the queue area when a space in which a distance between the adjacent queues is equal to or greater than a threshold distance.

7. The method of claim 1, further comprising, after the controlling:

controlling the at least one of the robots to be charged within the list of the robots to be charged to sequentially move toward a charging dock to charge the at least one of the robots to be charged until the robot is completely charged and becomes a completely-charged robot; and controlling the completely-charged robot to return to the queue within the queue area.

8. The method of claim 7, further comprising:

setting a SoC threshold range by computing a reduction of battery levels of the robots remaining within the queue area while the robots within the list of the robots to be charged are charged;

adding robots among the robots remaining within the queue area having a SoC value within the SoC threshold range to the list of the robots to be charged; and repeatedly performing a charging process of the robots to be charged within the list of robots to be charged by setting a target SoC based on a subsequent task start time when the charging of the robots included in the list of the robots to be charged is completed.

9. A robot control system comprising:

a plurality of robots; and a server configured to communicate with the plurality of robots, wherein the plurality of robots are configured to be arranged into a queue within a queue area, and wherein the server is configured to:

assign a task to a task-assigned robot among the plurality of robots, release a queue mode of the task-assigned robot when the task-assigned robot departs from the queue, and shift at least one or more robots among the plurality of robots within the queue forward by checking an occupancy rate for a forward part of the queue, in response to a departure of the task-assigned robot from the queue, compute an average State of Charge (SoC) of robots within the queue area, generate a list of robots to be charged, each robot on the list of robots to be charged having a SoC less than the average SoC, determine a movement method for moving away at least one of the robots to be charged from the queue area so that a minimum number of neighboring robots of the at least one robot to be charged move;

control the at least one of the robots to be charged within the list of robots to be charged to move away from the queue area by the movement method, wherein the movement method comprises:

controlling the at least one of the robots to be charged within the list of robots to be charged to move in a direction departing from the queue towards a neighboring robot, wherein the at least one of the robots to be charged moves together with the neighboring robot of at least one neighboring queue based on a mounting area of the at least one robot to be charge according to the movement method, and controlling the neighboring robot, after departing from the at least one neighboring queue, to enter an end of the at least one neighboring queue or an end of the queue while the at least one robot to be charged moves along a designated direction after departing from the queue area.

10. The robot control system of claim 9, wherein the server is further configured to:

sense a generation of a movement start event by the task-assigned robot, and release the queue mode of the task-assigned robot by checking a departed distance of the robot from a mounting area, in response to sensing the generation of the movement start event.

11. The robot control system of claim 10, wherein the server is configured to:

sense that the task-assigned robot is to enter the queue after completion of the task, and assign a mounting area of within the queue, in which the robot to enter is to be located after completion of the task, according to a preset condition, and wherein, after the task-assigned robot completes the task, the task-assigned robot moves to the assigned mounting area and switches into the queue mode.

12. The robot control system of claim 11, wherein the preset condition is related to at least one of the occupancy rate of the robots within the queue and a current position of the task-assigned robot to enter.

13. The robot control system of claim 9, wherein the server is configured to:

control the task-assigned robot to return to the queue of a queue area after completion of the task.

14. The robot control system of claim 9, wherein the server is configured to control the at least one of the robots to be charged within the list of robots to be charged to depart from the queue area by moving between adjacent queues within the queue area when a space in which a distance between the adjacent queues is equal to or greater than a threshold distance.

15. The robot control system of claim 9, wherein the server is configured to:

control the at least one of the robots to be charged within the list of the robots to be charged to sequentially move toward a charging dock to charge the at least one of the robots to be charged until the robot is completely charged and becomes a completely-charged robot, and control the completely-charged robot to return to the queue within the queue area.

16. The robot control system of claim 15, wherein the server is configured to:

set a SoC threshold range by computing a reduction of battery levels of the robots remaining within the queue area while the robots within the list of the robots to be charged are charged, add robots among the robots remaining within the queue area having a SoC value within the SoC threshold range to the list of the robots to be charged, and repeatedly perform a charging process of the robots to be charged within the list of robots to be charged by setting a target SoC based on a subsequent task start time when the charging of the robots included in the list of the robots to be charged is completed.

17. A robot control system comprising:

a plurality of robots; and a server configured to communicate with the plurality of robots, wherein the plurality of robots are configured to be arranged into a plurality of queues within a preset queue area, and wherein the server is configured to:

assign a task to a task-assigned robot among the plurality of robots, release a queue mode of the task-assigned robot when the task-assigned robot departs from a queue among the plurality of queues, move forward at least one or more robots among the plurality of robots within the queue by comparing location coordinates of pre-registered areas within the queue with a current location of a robot that has occupied the pre-registered areas in response to a departure of the task-assigned robot from the queue, and when a length of a queue among the plurality of queues is zero (0) or close to 0, a rear robot in an adjacent queue among the plurality of queues moves to another queue among the plurality of queues to continuously maintain the plurality of queues.

\* \* \* \* \*